US008527408B2

(12) United States Patent
Campbell et al.

(10) Patent No.: US 8,527,408 B2
(45) Date of Patent: Sep. 3, 2013

(54) INTEGRATED PAYMENT SYSTEM

(75) Inventors: Eric Campbell, Rye, NH (US); Amy Beth Hoke, Gilford, NH (US)

(73) Assignee: Bottom line Technologies (de), Inc., Portsmouth, NH (US)

( * ) Notice: Subject to any disclaimer, the term of this patent is extended or adjusted under 35 U.S.C. 154(b) by 0 days.

(21) Appl. No.: 13/400,087

(22) Filed: Feb. 19, 2012

(65) Prior Publication Data

US 2012/0197795 A1 Aug. 2, 2012

Related U.S. Application Data

(63) Continuation-in-part of application No. 12/460,936, filed on Jul. 27, 2009, now Pat. No. 8,122,490, which is a continuation of application No. 10/879,233, filed on Jun. 29, 2004, now Pat. No. 7,568,219, which is a continuation-in-part of application No. 10/139,596, filed on May 6, 2002, now abandoned, application No. 13/400,087, which is a continuation-in-part of application No. 13/374,487, filed on Dec. 30, 2011, and a continuation-in-part of application No. 13/200,581, filed on Sep. 26, 2011, and a continuation-in-part of application No. 13/068,558, filed on May 13, 2011.

(51) Int. Cl.
*G06Q 20/10* (2012.01)
*G06Q 40/00* (2012.01)

(52) U.S. Cl.
CPC .................................... *G06Q 20/10* (2013.01)
USPC ............................................................ 705/39

(58) Field of Classification Search
None
See application file for complete search history.

(56) References Cited

U.S. PATENT DOCUMENTS

| | | | | |
|---|---|---|---|---|
| 5,295,256 | A | 3/1994 | Bapat | |
| 5,440,744 | A | 8/1995 | Jacobson | |
| 5,619,710 | A | 4/1997 | Travis | |
| 6,052,785 | A | 4/2000 | Lin | |
| 6,104,798 | A | 8/2000 | Lickiss | |
| 6,594,692 | B1 | 7/2003 | Roisman | |
| 6,757,710 | B2 | 6/2004 | Reed | |
| 6,952,737 | B1 | 10/2005 | Coats | |
| 6,954,632 | B2 | 10/2005 | Kobayashi | |
| 6,961,849 | B1 | 11/2005 | Davis | |
| 7,003,781 | B1 | 2/2006 | Blackwell | |
| 7,085,840 | B2 | 8/2006 | De Jong | |
| 7,133,845 | B1 | 11/2006 | Ginter | |
| 7,233,997 | B1 | 6/2007 | Leveridge | |
| 7,284,036 | B2 | 10/2007 | Ramaswamy | |
| 2002/0124137 | A1 | 9/2002 | Ulrich | |
| 2002/0184054 | A1 | 12/2002 | Cox | |
| 2002/0184349 | A1 | 12/2002 | Manukyan | |
| 2003/0101446 | A1 | 5/2003 | McManus | |
| 2005/0138186 | A1 | 6/2005 | Hesselink | |
| 2006/0031407 | A1 | 2/2006 | Dispensa | |
| 2006/0168023 | A1 | 7/2006 | Srinivasan | |
| 2009/0089194 | A1 * | 4/2009 | Mathis et al. | 705/34 |

* cited by examiner

*Primary Examiner* — Bruce I Ebersman
(74) *Attorney, Agent, or Firm* — Timothy P O Hagan

(57) ABSTRACT

A payment system executes payments from payers to vendors. An unattended interface system automates the uploading of payments file from each payer to the system. A web services transfer server performs the unattended transfer. Steps of a payment server generating an electronic funds transfer file with a group of fund transfer records for each payment represented by a record of the payment file. After the electronic funds transfer file is complete, the steps further comprise transferring the electronic fund transfer file to an electronic payment network for execution. Remittance records are transferred to the vendor utilizing an unattended transfer executed by the web services transfer server.

10 Claims, 31 Drawing Sheets

User ID 314

| Index 360 | Transfer Client ID 362: User Group ID 354 | Transfer Client ID 362: User ID 356 | Password 358 | Interval 364 | Session Time 366 | Alert Instruction 367 | Session ID 368 | Status Field 369 |
|---|---|---|---|---|---|---|---|---|
| | Group ID 71 | User ID 72 | Encrypted Password 82 | Time Interval 78 | Time Stamp 93 | Notification Address 79 | Session ID 83 | T |
| | | | | | | | | F |
| | | | | | | | | |
| | | | | | | | | |
| | | | | | | | | |

352

310

| Event Key Table 311 | | | |
|---|---|---|---|
| Index 360 | Transfer Client ID 362 | | Event Key 315 |
| | Group ID 354 | User ID 356 | |
| | Group ID 71 | User ID 72 | Event Key Value 80 |
| | Payer A | | 001 |
| | Vendor A | | 002 |
| | | | |
| | | | |
| | | | |
| | | | |
| | | | |

| Event Parameter Table 316 | | |
|---|---|---|
| Event Key 315 | Parameter ID 321 | Parameter Value 322 |
| Event Key Value 80 | | |
| | | |
| | | |
| | | |
| | | |
| | | |
| | | |
| | | |

Event Parameter Table 316

| Event Key 315 | Parameter ID 321 | Parameter Value 322 |
|---|---|---|
| 001 | File Name 323 | |
| 001 | Upload Directory Path 324 | |
| 001 | BLOB Handling 326 | |
| 001 | Destination Group ID 325 | |
| 001 | BLOB Loading Rules 327 | |
| 001 | Status 328 | |
| | Email Address 101 | |
| | Email Code 102 | |
| | | |

Event Parameter Table 316

| Event Key 315 | Parameter ID 321 | Parameter Value 322 |
|---|---|---|
| 002 | File Name 342 | |
| | Download Directory Path 343 | |
| | Event Type 344 | |
| | BLOB Generation 345 | |
| 002 | Profile ID 347 | |
| | Extract Rules 349 | |
| | Class 351 | |
| | Offset 353 | |
| | Status 355 | |
| | Printer 359 | |
| | Print Code 357 | |
| | Email Address 101 | |
| | Email Code 102 | |

| Email Codes 102 | |
|---|---|
| Code | Description |
| 01 | No Email Notification |
| 02 | Send on Success |
| 03 | Send on Failure |
| 04 | Send on Success or Failure |

| Available Printers 318 | | | |
|---|---|---|---|
| Index | Group ID 354 | User ID 356 | Printer ID 378 |
| | | | Printer ID 81 |
| | | | |
| | | | |

| Transfer Methods 51 | Parameters |
|---|---|
| Check Status | User Group, User ID |
| Log On | User Group, User ID, Password |
| Get Password | Session ID |
| Send Printers | Session ID, Printers IDs |
| Retrieve Active Event Keys | Session ID |
| Read Event | Session ID, Event Key |
| Update Event | Session ID, Event Key, Status Information, Offset |
| Create BLOB | Session ID, Profile ID, Extract Rules |
| Check for Available BLOB | Session ID, Class, Offset |
| Download BLOB | Session ID, BLOB ID |
| Upload File | Session ID, File Name, BLOB Contents |
| Set Destination BLOB Owner | Session ID, BLOB ID, User Group |
| Process BLOB | Session ID, BLOB ID, Loading Rules |

Figure 8

(Log On)

(Check Status)

(Get Password)

(Send Printers)

(Retrieve Active Event Keys)

(Create BLOB)

(Update Event)

(Read Event)

(Check for Available BLOB)

(Download BLOB)

(Upload File)

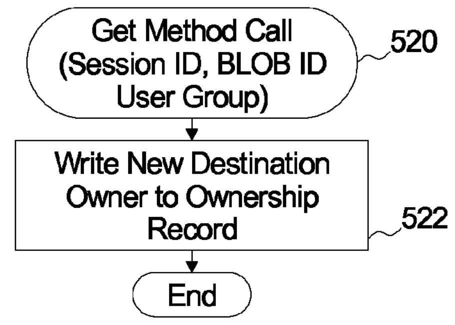
Figure 20
(Set Destination BLOB Owner)
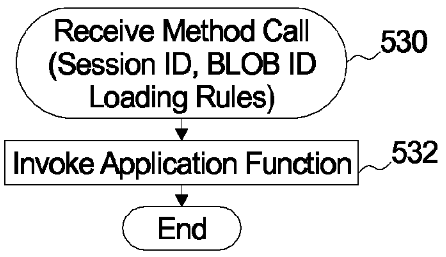
Figure 21
(Process BLOB)
Ownership Table 62
| Index | BLOB ID Field 85 | Class Field 86 | Destination Group ID Field 87 | Offset Field 88 |
|---|---|---|---|---|
| | BLOB ID 89 | Class Value 90 | Destination Group ID 91 | Offset Table 92 |
| | | | | |
| | | | | |
| | | | | |
| | | | | |
| | | | | |
63
Figure 22

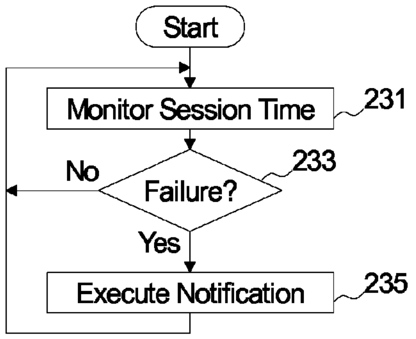

Figure 23

| Local Processes 23 | | |
|---|---|---|
| Index | Process | Parameters |
| 1 | Check Status | User Group, User ID, Password |
| 2 | Session ID | User Group, User ID, Password |
| 3 | Get Password | Session ID |
| 4 | Send Printers | Session ID, Printers IDs |
| 5 | Retrieve Active Event Keys | Session ID |
| 6 | Read Event | Session ID, Event Key |
| 7 | Update Event | Session ID, Event Key, Status Information, Offset |
| 8 | Create BLOB | Session ID, Profile ID, Extract Rules |
| 9 | Check for Available BLOB | Session ID, Class, Offset |
| 10 | Download BLOB | Session ID, BLOB ID |
| 11 | Upload File | Session ID, File Name, BLOB Contents |
| 12 | Set Destination BLOB Owner | Session ID, User Group |
| 13 | Process BLOB | Session ID, BLOB ID, Loding Rules |
| 14 | Save Password | Password |
| 15 | Create and Write File | File Name |
| 16 | Read File | File Name |
| 17 | Send to Printer | Printer ID, File Name |
| 18 | Rename File | Old File Name, New File Name |

Figure 24

Audit Table 312

| Index | TC ID 24 | Date 341 | Time 346 | Method Called 348 | Parameters Passed 350 |
|---|---|---|---|---|---|
| | | | | | |
| | | | | | |
| | | | | | |
| | | | | | |
| | | | | | |
| | | | | | |

| SIC Code Database 302 | |
|---|---|
| Company ID | SIC |
| Company A | 0001 |
| Company B | 0003 |
| Company C | 0005 |
| Company D | 0003 |
| Company E | 0007 |
| Company F | 0001 |

304

Network 20

Figure 30

| Sensitivity Score 306 | |
|---|---|
| SIC 307 | Score 308 |
| 0001 | 0 |
| 0002 | 3 |
| 0003 | 5 |
| . . . | . . . |
| . . . | . . . |
| . . . | . . . |
| 9999 | 1 |

Figure 31

| Vendor Registry 112 | | | | | | |
|---|---|---|---|---|---|---|
| System ID 130 | Name 132 | EIN 134 | S.I.C. 135 | Contact Information 136 | Remittance Address 138 | Remittance Account Information 140 |
| Vendor A | | | | | | Routing/Account |
| Vendor C | | | | | | Routing/Account |
| Vendor F | | | | | | Routing/Account |

128

| Payer Rate Records 141a | |
|---|---|
| Payer ID 142 | Rate 143 |
| Payer A | 1.25% |
| Payer C | 1.75% |

144a

| Payer Rate Records 141b | |
|---|---|
| Payer ID 142 | Rate 143 |
| Payer A | 1.00% |
| Payer B | 2.00% |
| Payer F | 0.5% |

| Payer Registry 114 | | | | | |
|---|---|---|---|---|---|
| Payer ID 122 | Name 146 | EIN 147 | Contact Information 148 | Participating Bank ID 149 | Funding Account Information 124 |
| Payer A | | | | Bank A | Routing/Account |
| Payer B | | | | Bank A | Routing/Account |
| Payer C | | | | Bank A | Routing/Account |

| Participating Bank Registry 501 | | |
|---|---|---|
| Bank ID 506 | Bank Name 508 | Pooling Account Identifier 509 |
| Bank A | | Routing/Account |
| Bank B | | Routing/Account |
| Bank C | | Routing/Account |

| Remittance Database 330 | | | | |
|---|---|---|---|---|
| Payment ID 334 | Payer ID 336 | Vendor ID 338 | Payment Amount 339 | Remittance String 340 |
| | | | | |
| | | | | |
| | | | | |

| Payer Centric Spend 241 | |
|---|---|
| Criteria | Score |
| 0 - $5,000 | 1 |
| $5,001 - $10,000 | 2 |
| $10,001 - $15,000 | 3 |
| $15,001 - $50,000 | 4 |
| $50,001 + | 5 |

| Payer Centric Frequency 245 | |
|---|---|
| Criteria | Score |
| 1 | 1 |
| 2 - 3 | 2 |
| 4 - 10 | 3 |
| 11 - 15 | 4 |
| 16 + | 5 |

| Network Spend 249 | |
|---|---|
| Criteria | Score |
| 0 - $5,000 PPA | 1 |
| $5,001 - $10,000 PPA | 2 |
| $10,001 - $15,000 PPA | 3 |
| $15,001 - $50,000 PPA | 4 |
| $50,001 + PPA | 5 |

| Network Frequency 252 | |
|---|---|
| Criteria | Score |
| 1 PPA | 1 |
| 2 - 3 PPA | 2 |
| 4 - 10 PPA | 3 |
| 11 - 15 PPA | 4 |
| 16 + PPA | 5 |

| Weighting 253 | |
|---|---|
| Score | Weight Factor 255 |
| Sensitivity Rating | 1.0 |
| Payer Centric Spend | 0.65, 0.2 if PCS>4 & PCF<2 |
| Payer Centric Frequency | 0.85 |
| Network Spend | 0.75, 0.2 if NS>4 & NF<2 |
| Network Frequency | 0.95 |

Figure 35E

| Rate Tiers 256 | | |
|---|---|---|
| Score 258 | Tier 259 | Rate 261 |
| 1 | Tier_1 | 0% |
| 2 | Tier_2 | 0.75% |
| 3 | Tier_3 | 1.5% |
| 4 | Tier_4 | 2.25% |
| 5 | Tier_5 | 3.0% |

Figure 35F

| Payment Instruction File 534a | | |
|---|---|---|
| Payer A 536 | | |
| Vendor ID 538 | Payment Amount 540 | Remittance String 542 |
| Vendor 12c | $100 | |
| Vendor 12e | $200 | |
| Vendor 12i | $300 | |

| Payment Instruction File 534b | | | |
|---|---|---|---|
| Payer ID 536 | Vendor ID 538 | Payment Amount 540 | Remittance String 542 |
| Payer B | Vendor 12b | $400 | |
| Payer B | Vendor 12c | $500 | |
| Payer B | Vendor 12f | $600 | |

| Payer ID 536 | Vendor ID 538 | Payment Amount 540 | Remittance String 542 |
|---|---|---|---|
| | | | |

544a

| Payer ID 536 | Vendor ID 538 | Payment Amount 540 | Remittance String 542 |
|---|---|---|---|
| | | | |

544b

| Payer ID 536 | Vendor ID 538 | Payment Amount 540 | Remittance String 542 |
|---|---|---|---|
| | | | |

| Payment Instruction File 534d | | | |
|---|---|---|---|
| Participating Bank ID: Bank A 548 | | | |
| System ID (Payer) 536 | System ID (Vendor) 538 | Payment Amount 540 | Remittance Information 542 |
| Payer A | Vendor B | | |
| Payer B | Vendor B | | |
| Payer C | Vendor F | | |

550 (rows Payer A – Payer C)

Figure 36D

| EFT File 1302 | | | |
|---|---|---|---|
| Participating Bank ID: Bank A 1304 | | | |
| Payment ID 1308 | Bank A Pooling Account 1310 | Vendor Remittance Account 1312 | Payment Amount 1314 |
| | Routing/Account | Routing/Account | |
| | Routing/Account | Routing/Account | |
| | Routing/Account | Routing/Account | |

1306

INTEGRATED PAYMENT SYSTEM

TECHNICAL FIELD

The present invention relates to electronic payment and remittance systems and more particularly, to an electronic payment and remittance system which assesses a variable transaction fee to each vendor and provides a variable rebate to each payer.

BACKGROUND OF THE INVENTION

Electronic payments are becoming more common place for settling both consumer and business to business transactions. The most common electronic payment mechanism in the consumer world is a payment card such as a credit card, charge card, or debit card. Generally, payment cards are issued by an operator of a card payment system such as American Express or Diners Club (sometimes called a closed loop system), or by a bank or financial institution under licensing from a bank card brand provider such as Visa or Mastercard (formerly bank card associations).

Recently, card issuers, in particular the bank card brand providers and their participating banks, have been marketing card payments for business to business transactions. In general, an Issuing Bank issues a purchase card to a business and the business uses the card to pay vendors. Vendors must have a Merchant Account with an Acquiring bank and pay the applicable fees as determined by the Acquiring Bank. The Acquiring bank pays an interchange fee on the transaction, at least part of which is paid to the Issuing Bank. Currently purchasing card payments represent less than 4% of the business to business payments in the United States. It is speculated that purchasing card payments are not being adopted for business to business transactions as rapidly as adoption for consumer transactions for at least two reasons. First, most business to business payments are payments in the ordinary course of an ongoing relationship between the vendor and the payer and the vendor sees little credit risk in being paid. As such, the vendor sees little advantage of receiving a guarantee of payment at authorization, and while many vendors may be willing to pay a small transaction fee for the convenience of immediate payments, the guarantee of immediate payment is not enough to justify payment of the high fixed transaction fee charged by the Acquiring Bank. Second, purchase card payments are difficult for both the payer and the vendor to reconcile in their respective accounts payable and accounts receivable accounting systems without at least duplicating manual entry of at least some payment/remittance information in multiple systems.

Even though there has been little adoption of purchase cards and card payments for business to business transactions, business to business payers still seek electronic payment solutions to lower costs associated with traditional check payments, and possible generate revenue from, their accounts payable.

In view of the foregoing, what is needed is an improved an electronic payment and remittance system when enables a payer to determine, on a vendor specific basis, the fee, if any, that the vendor will pay for receipt of payments and the rebate, if any, the payer will receive based on payments to each vendor and for such system to have a seamless is integration with the payer's enterprise resource planning system (or accounts payable system) and the vendors enterprise resource planning system (or accounts receivable system) for seamless transfer of payment information and remittance information.

SUMMARY OF THE INVENTION

A first aspect of the present invention comprises a system for making payments from each payer of a community of payers to each vendor of a community of vendors. The community of payers comprises multiple distinct sub groups of payers, each sub group of payers being uniquely associated with a distinct bank of a group of participating banks. The payment system comprises a computer readable medium and a processor coupled to the computer readable medium.

The payments are made in response to each payer (or participating bank) submitting a payment instruction file comprising a group of unique payment records, each payment record comprising: i) the system ID of a disbursing payer, the disbursing payer being a payer within the sub group of payers associated with the originating bank; ii) the system ID of a selected vendor, the selected vendor being a vendor within the community of vendors to which the disbursing payer is issuing a payment; and iii) identification of the amount of the payment.

An event parameters database may be encoded to the computer readable medium. The event parameters database may comprise, for each payer, a unique record. The record includes: i) a unique login ID identifying an unattended interface module installed on a workstation coupled to a local area network controlled by the payer, ii) identification of a file name used by the payer for each payment instruction file generated by the payer; and iii) a directory path identifying a directory on the local area network controlled by the payer;

A vendor database may be encoded to the computer readable medium. The vendor database may comprise a unique vendor record for each vendor of the community of vendors. Each vendor record may comprise: i) identification of a distinct one of the vendors; ii) a unique system ID assigned to the vendor; and iii) a vendor remittance account identifier, the vendor remittance account identifier comprising a routing number and account number of a bank account to which payments to the vendor are transferred;

The system may include a web services server comprising computer readable medium, a processor coupled to the computer readable medium, and transfer server coded to the computer readable medium. The transfer server comprises steps executed by the processor in response to receipt of each web services call from each payer's unattended interface module. The steps comprise, in response to a first web services call from a payer's unattended interface module, the first web services call identifying the payer: i) looking up, in the record of the events parameter database associated with the login ID identifying the payer, the file name and the directory path; and ii) returning, to the payer's unattended interface module, the file name and the directory path;

The steps further comprise, in response to a second web services call from the payer's unattended interface module, the second web services call comprising the payment instruction file with the file name, as obtained by the unattended interface module from the location on the local area network identified by the directory path: i) storing the payment instruction file as a binary object in a computer readable database; and ii) returning to the payer's unattended interface module a binary object ID identifying the binary object.

The steps further comprise, in response to a third web services call from the payer's unattended interface module, the third web services call comprising the binary object ID and instructions to provide the web services call to the payment server: i) looking up the binary object with the binary object ID; and ii) providing the binary object to the payment server.

The system further comprises a payment server comprising computer readable medium, a processor coupled to the computer readable medium, and a payment application coded to the computer readable medium. The payment application comprises steps executed by the processor. The steps comprise obtaining each payment file from the computer readable database and, for each payment file, generating an electronic funds transfer file with a group of fund transfer records by, for each payment record of the payment instruction file: i) assigning a unique payment ID to the payment record of the payment instruction file and populating the payment ID to a unique one of the fund transfer records; ii) populating the amount of the payment from the payment record of the payment instruction file to the fund transfer record; iii) populating a pooling account identifier of the originating bank to a field of the fund transfer record identifying an account from which the payment is debited; and iv) looking up, in the vendor database, the vendor account identifier for the selected vendor and populating such vendor account identifier to a field of the fund transfer record identifying an account to which the payment is credited.

After the electronic funds transfer file is complete, the steps further comprise transferring the electronic fund transfer file to an electronic payment network for execution.

In one aspect, the system may further comprise a web server and/or a mobile application server coupled to the payment server. The web server and/or mobile application server comprises comprising computer readable medium, a processor coupled to the computer readable medium, and a web server or mobile application server application coded to the computer readable medium. The web server and/or mobile application server comprises steps executed by the processor. The steps comprise, in response to each disbursing payer establishing a secure session with the system: i) obtaining a funding total for the disbursing payer from the payment server, the funding total being the aggregate sum of payment amount of each record of the payment instruction file; ii) generating a web page (or data object for a mobile app) with the funding total; iii) rendering the web page (or data object) with the funding total on a remote browser system or a remote mobile app system of the disbursing payer; iv) obtaining disbursing payer approval of the funding total from the remote browsing system or remote mobile app system on which the funding approval object is rendered and v) providing an indication of approval to the payment application.

In this aspect, the instructions of the payment application only transfer the electronic fund transfer file to the electronic payment network for exaction after the mobile application server obtains disbursing payer approval of the funding total.

In one aspect, the web server or mobile application server may further comprise unattended interface configuration steps. The unattended interface configuration steps comprise, in response to each payer establishing a secure session with the system and selecting an unattended interface configuration option: i) obtaining, from the login ID identifying payer's unattended interface module; ii) obtaining an identification of the file name and an identifications of the directory path; and iii) writing each of the login ID, the file name, and the directory path to a unique record of event parameters database such that the file name and directory path are made available to the payer's unattended interface module when the payer's unattended interface module makes the first web services call to the web services server.

In another aspect, each payment record of each payment instruction file further comprises remittance information. The remittance information may be text describing the purposes of the payment. In this aspect, the system further comprises a remittance database encoded to the computer readable medium. The remittance database comprises a group of remittance records. Each remittance record includes, for a unique payment: i) the payment ID; ii) the system ID of the disbursing payer; iii) the system ID of the selected vendor; iv) the payment amount; and v) the remittance information.

In this aspect, the instructions of the payment application further include, for each fund transfer record generated, populating to a record of the remittance database. The record includes: i) the payment ID; ii) the system ID of the disbursing payer; iii) the system ID of the selected vendor; iv) the payment amount; and v) the remittance information.

In this aspect, the steps of the web services server further comprise, in response to a first web services call from the vendor's unattended interface module, the first web services call identifying the vendor and identifying a time period: i) looking up, in the remittance database, remittance records for payments made to the vendor within the identified time period; ii) generating the remittance file by populating remittance records for payments made to the vendor within the identified time period; and iii) returning, to vendor's unattended interface module, a binary object identifier identifying the remittance file.

In this aspect, the steps of the web services server further comprise, in response to a second web services call from the vendor's unattended interface module, the second is web services call including the binary object identifier i) retrieving the remittance file; and ii) returning to vendor's unattended interface module, in response the create remittance file web services call, the remittance file.

For a better understanding of the present invention, together with other and further aspects thereof, reference is made to the following description, taken in conjunction with the accompanying drawings. The scope of the invention is set forth in the appended claims.

BRIEF DESCRIPTION OF THE DRAWINGS

FIG. 5*a* is table representing an exemplary event key table in accordance with one embodiment of the present invention;

FIGS. 5*b*-5*d* are tables representing an exemplary event parameter table in accordance with one embodiment of the present invention;

FIG. 6 is a table representing exemplary email codes in accordance with one embodiment of the present invention;

FIG. 7 is a diagram representing an exemplary available printers table in is accordance with one embodiment of the present invention;

FIG. 8 is a table representing exemplary transfer methods operated by the transfer server in accordance with one embodiment of the present invention;

FIGS. 9 through 21 represent operation of an exemplary transfer method operated by the transfer server in accordance with one embodiment of the present invention;

FIG. 22 represents an ownership table in accordance with one embodiment of the present invention;

FIG. 23 represents an exemplary session ID monitoring process operated by the transfer server in accordance with one embodiment of the present invention;

FIG. 24 is a table representing exemplary local processes operated by the transfer client in accordance with one embodiment of the present invention;

FIG. 28 is a table representing an audit table in accordance with one embodiment of the present invention;

FIG. 30 is a table diagram representing a standard industry code database in accordance with an aspect of the present invention;

FIG. 31 is a table diagram representing a matching of sensitivity scores to industry codes in accordance with an aspect of the present invention;

FIG. 32*a* is a table diagram representing data elements stored in, and relationships between data elements stored in, a vendor registry in accordance with an is aspect of the present invention;

FIG. 32*b* is a table diagram representing data elements stored in, and relationships between data elements stored in, a payer registry in accordance with an aspect of the present invention;

FIG. 32*c* is a table diagram representing data elements stored in, and relationships between data elements stored in, a participating bank registry in accordance with an aspect of the present invention;

FIG. 32*d* is a table diagram representing data elements stored in, and relationships between data elements stored in, a remittance database in accordance with an aspect of the present invention;

FIG. 35*a* is a table diagram representing payer centric spend scores and criteria for determining a payer centric spend score in accordance with an aspect of the present invention;

FIG. 35*b* is a table diagram representing payer centric frequency scores and criteria for determining a payer centric frequency score in accordance with an aspect of the present invention;

FIG. 35*c* is a table diagram representing network spend scores and criteria for determining a network spend score in accordance with an aspect of the present invention;

FIG. 35*d* is a table diagram representing network frequency scores and criteria for determining a network frequency score in accordance with an aspect of the present invention;

FIG. 35*e* is a table diagram representing weight factors to apply to in accordance with an aspect of the present invention;

FIG. 35*f* is a table diagram representing rate tiers to apply to in accordance with an aspect of the present invention;

FIG. 36*a* is a table diagram representing data elements stored in, and relationships between data elements stored in, a payment instruction file in accordance with a first aspect of the present invention;

FIG. 36*b* is a table diagram representing data elements stored in, and relationships between data elements stored in, a payment instruction file in accordance with a second aspect of the present invention;

FIG. 36*c* is a table diagram representing data elements stored in, and relationships between data elements stored in, a payment instruction file in accordance with a third aspect of the present invention;

FIG. 36*d* is a table diagram representing data elements stored in, and relationships between data elements stored in, a payment instruction file in accordance with a fourth aspect of the present invention;

DETAILED DESCRIPTION OF THE INVENTION

Figure 1A:
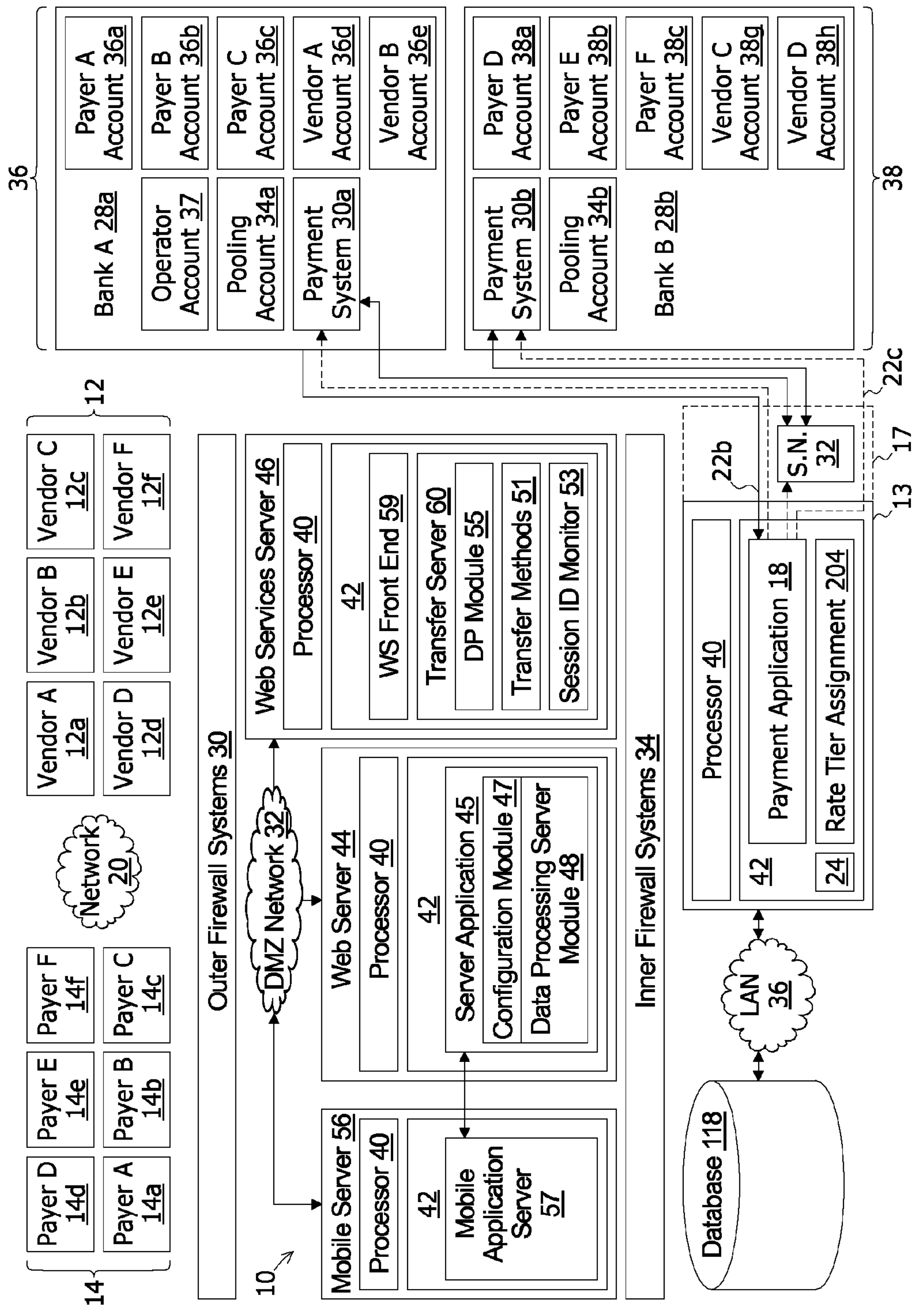
FIG. 1*a* is a block diagram representing architecture of a system for making payments from each payer of a community of payers to each vendor of a community of vendors, all in accordance with an aspect of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code/instructions which is encoded within computer readable medium accessible to the processor, or a combination of a hardware circuit(s) and a processor or control block of an integrated circuit executing machine readable code encoded within a computer readable medium. As such, the term circuit, module, server, application, or other equivalent description of an element as used throughout this specification is intended to encompass a hardware circuit (whether discrete elements or an integrated circuit block), a processor or control block executing code encoded in a computer readable medium, or a combination of a hardware circuit(s) and a processor and/or control block executing such code.

It should also be appreciated that table structures represented in this application are exemplary data structures only, of a non transitory nature embodied in computer readable medium, and intended to show the mapping of relationships between various data elements. Other table structures, data objects, structures, or files may store similar data elements in a manner that maintains the relationships useful for the practice of the present invention.

Within this application the applicant has depicted and described groups of certain elements. As used in this application, the term group (and the term community) means at least three of the elements. For example, a group of vendors means at least three vendors. When a group, for example a first group, is referred to as being distinct, or distinct from a second group, it means that the first group contains at least one element that is not present in the second group and the second group includes at least one element that is not present in the first group. The use of the term unique with respect to an element within a group or set of elements means that that the element is different then each other element in the set or group.

Within this application, the applicant has used the term database to describe a data structure which embodies groups of records or data elements stored in a volatile or non volatile storage medium and accessed by an application, which may be instructions coded to a storage medium and executed by a processor. The application may store and access the database.

Turning to FIG. 1*a*, an exemplary architecture is shown in which a payment system 10 executes payments from each payer 14*a*-14*f* of a community of payers 14 to each vendor 12*a*-12*f* of a community of vendors 12 wherein the community of payers 14 comprises multiple distinct subgroups of payers, each subgroup being mutually exclusive of other subgroups. Each subgroup is associated with a distinct bank of a group of participating banks. For example, a first subgroup of payers 14*a*, 14*b*, 14*c*, all of which may be customers of participating bank 28*a*, are associated with bank 28*a*. A second subgroup of payers 14*d*, 14*e*, 14*f*, all of which may be customers of participating bank 28*b*, are associated with bank 28*b*.

The system 10 further provides for secure and unattended remote file transfer of payment instruction files from each payer's enterprise resource planning (ERP) or other accounts payable application to the system 10 and approval workflows prior to releasing payments to the vendors.

The system 10 may further assess a transaction fee to each vendor in conjunction with executing a payment from a payer to the vendor. The transaction fee assessed to the vendor is based on a variable transaction rate. More specifically, the fee is the product of multiplying the amount of the payment by the rate that is applicable to payments made by the particular payer to the particular vendor. The rate is referred to as "variable" because: i) the rate is variable amongst vendors, the same payer may use different rates for different vendors; and ii) the rate is variable amongst payers, the same vendor may be subjected to different rates, based on the particular payer making the payment.

Overview of Payment System

The payment system 10 may comprise a web server 44, a web services server 46, a mobile application server 56, a payment application server 13, and a database 118. Each of the web server 44, web services server 46, the mobile application server 56, and payment application server 13 may comprise a processor 40 executing processing steps or an application encoded to a computer readable media 42.

In the exemplary embodiment, each of the web server 44, the web services server 46 and the mobile application server 56, are coupled to an IP compliant network typically referred to as a DMZ network 32—which in turn is coupled to an open network such as the public internet 20 by outer firewall systems 30 and coupled to an IP compliant local area network 36 by inner firewall system 34. The payment application server 13 and the database 118 may each be coupled to the local area network 36. Each payer 14*a*-14*f* and each vendor 12*a*-12*f* are systems which communicate with the payment system 10 via the Internet 20.

For purposes of illustrating the invention, two of the group of participating banks 28*a* and 28*b* are depicted. Each bank, for example bank 28*a*, may include a payment system 30*a* (i.e. instructions coded to a computer readable medium and executed by a processor) which manages deposit accounts 36, including execution of credit and debit transactions to deposit accounts 36 in a traditional manner. Similarly bank 28*b* may include a payment system 30*b* (i.e. instructions coded to a computer readable medium and executed by a processor) which manages deposit accounts 38, including execution of credit and debit transactions to deposit accounts 38 in a traditional manner.

The payment system 30*a*, 30*b* of each bank 28*a*, 28*b* may further be coupled to a settlement network 32 which transfers funds between banks for settlement of payments between accounts at different banks. Exemplary settlement networks include the National Automated Clearing House Association (NACHA) for settling ACH transactions and the Federal Reserve for settling wire transactions. The settlement network may also be a card payment system operator such as American Express or a bank card brand provider—or an association, such as bank card brand providers Visa or MasterCard, which settles payments typically referred to as card payments.

Each bank may include, and each bank's payment system 30*a*, 30*b* may also manage, multiple customer accounts 36 (for bank 28*a*) and 38 (for bank 28*b*). Each customer account is an account to which credit and debit transactions are posted representing credits and debits to the funds of a particular customer associated with the account (i.e. the account holder).

For example, bank 28*a* may have a customer account 36*a* for Payer 14*a*, a customer account 36*b* for payer 14*b*, a customer account 36*c* for payer 14*c*, a customer account 36*d* for vendor 12*a*, a customer account 36*e* for vendor 12*b*.

For example, bank 28*b* may have a customer account 38*a* for payer 14*d*, a customer account 38*b* for payer 14*e*, a customer account 38*c* for payer 14*f*, a customer account 38*d* for vendor 12*c*, a customer account 38*e* for vendor 12*d*.

Each customer account for a payer may be a deposit account such as a commercial checking account. Each customer account for a vendor may be a deposit account such as a commercial checking account or a merchant services account such as an account funded upon settlement of a card payment transaction.

Each participating bank 28*a*, 28*b* may further include, and the banks' payment system 30*a* may further manage, a settlement or pooling account 34*a*, 34*b* which may be a fiduciary consolidation account with legal title to funds therein belonging to the bank, such as a commercial checking account, to which credits and debit transactions are posted representing credits to fund payments to be issued by payers and debits to disburse payment to vendors.

For purposes of illustrating this invention, bank 28*a* may further include, and the banks' payment system 30*a* may further manage, an operator account 37 which may be a deposit account, such as a commercial checking account, to which credits and debit transactions are posted representing credits and debits to funds of the operator of the system 10.

In an exemplary embodiment, the payment application server 13 may be communicatively coupled to each payment system 30*a*, 30*b* of each participating bank 28*a*, 28*b*. In another exemplary embodiment, the payment application server 13 may further be coupled to the settlement network 32, or may alternatively be coupled to the settlement network 32 in lieu of being coupled to a payment systems 30*a*, 30*b* of a participating banks 28*a*, 28*b*.

In yet another exemplary embodiment, the settlement network 32 may be part of the payment system 10 as depicted by the dashed line 17 in FIG. 1*a*. For example, if the payment system 10 is operated by a bank card association the payment system 10 may include a proprietary settlement network 32.

Overview of Payers and Vendors

Figure 1B:
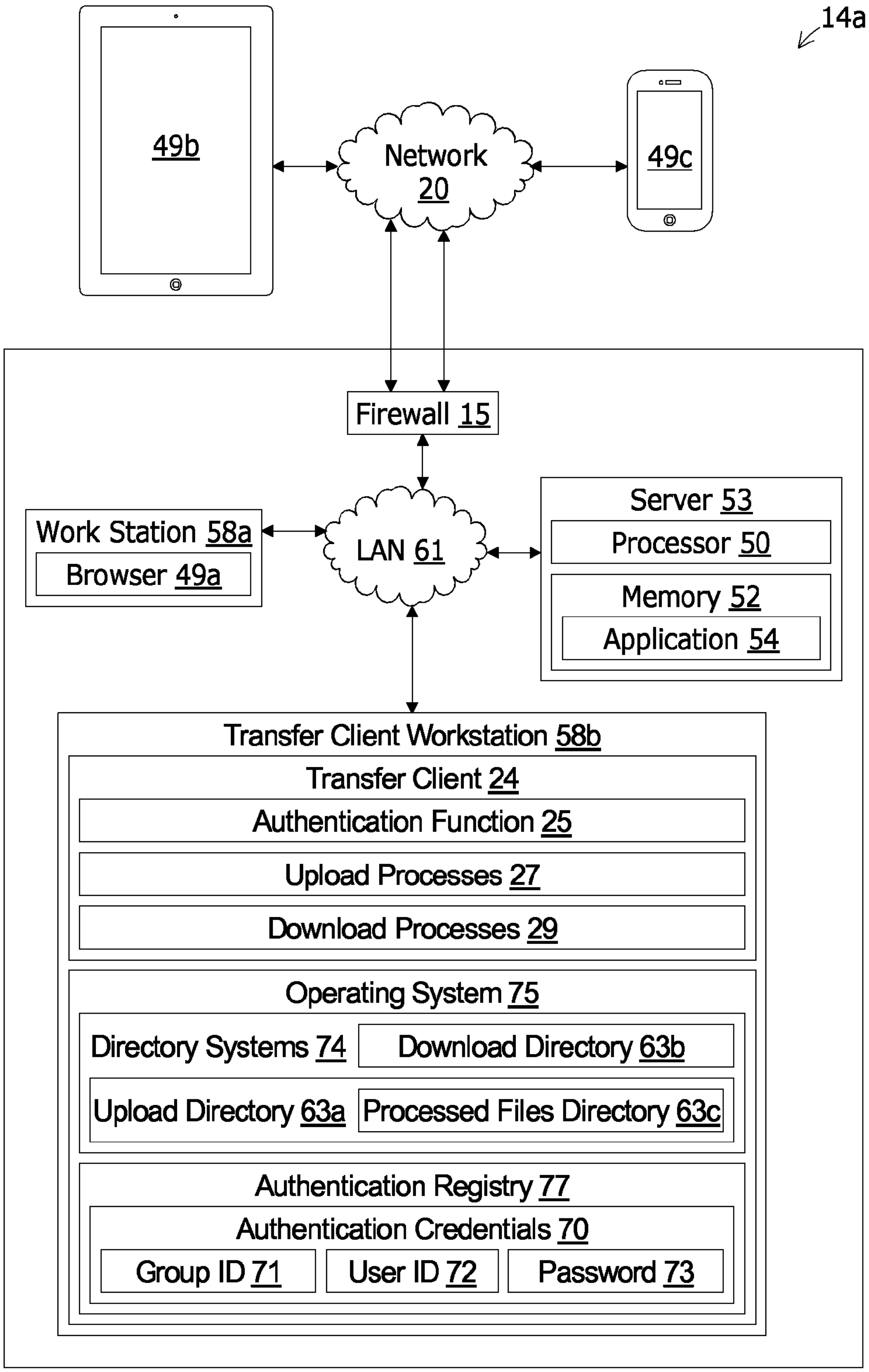
FIG. 1*b* is a block diagram representing a payer in accordance with an aspect of the present invention.

Turning briefly to FIG. 1*b* in conjunction with FIG. 1*a*, in an exemplary embodiment, each payer and each vendor, using payer 14*a* for example, may be a business that includes at least one computer system or server 53. The computer system(s) or server(s) 53 include at least one processor 50 and associated memory 52 programmed with an enterprise resource planning application or accounting application for managing accounts payable (or accounts receivable) 54.

In a typical environment, the computer system(s) or server(s) 53 operating the accounting application 54 may be coupled to a local area network 61 and accessed by entitled users of workstations, such as workstation 58*a*, and may be used for managing the payer's accounts payables and issuing payments to its vendors or, in the case of a vendor, managing accounts receivables and issuing invoices to customers. The local area network 61 may be coupled to the internet 20 via firewall systems 15.

Each payer and each vendor, again using payer 14*a* as an example, may further include one or more access systems for interfacing with the system 10. Exemplary access systems include: i) a web browser 49*a* on a workstation 58*a*; ii) a tablet computer 49*b* such as an iPad which accesses the system 10 utilizing a custom client application on the tablet; and iii) other mobile devices 49*c* such as smart phones which access the system utilizing a custom client application on the mobile device, in each case over permutations of the internet, wired or wireless internet service provider networks, and a local area network.

Workstation 58*a*, may be a known networked computer system with a known operating system (not shown), IP networking hardware and software (not shown), and a known browser system 49*a* for establishing a TCP/IP connection with a remote web server and enabling the browser 49*a* to navigate web pages provided by the remote web server 44. As such, the workstation 58*a* is useful for establishing a connection with the web server 44 for: i) navigating web pages provided by the data processing server module 48 in association with use of the system 10; and ii) navigating web pages provided by the configuration module 47 for configuring the systems for unattended remote file transfer as will be discussed in more detail herein.

Each payer and each vendor may further include a transfer client workstation 58*b* coupled to the local area network 61. The transfer client workstation 58*b* may also be a known networked computer system with an operating system 75 and IP networking hardware and software (not shown). The workstation 58*b* also includes a transfer client application 24.

The operating system 75 may manage a known directory system 74 and a known authentication registry 77. For purposes of illustrating the present invention, the directory system 74 comprises an upload directory 63*a* and a download directory 63*b*, each of which may be local or network drives available to each of the transfer client workstation 58*a* and the business process application servers 46 over the local area network 61. As such the application 54 may be configured, in conjunction with the transfer client workstation 58*b* to perform automated and unattended exchange of files with the payment system 10 (FIG. 1*a*). More specifically, the application 54 may be configured to: i) write data files, such as payment instruction files which are intended for transfer to the system 10, to a predetermined upload directory 63*a* on the network 61; and ii) retrieve data files expected from the system 10 from a predetermined download directory 63*b* on the network 61.

As will be discussed in more detail herein, the authentication registry 77 may store authentication credentials 70 used by the transfer client 24 for authenticating itself to the web services server 46. The authentication credentials 70 comprise a group ID value 71, a user ID value 72, and a Password 73. The authentication credentials are stored in an encrypted format.

In operation, the transfer client 24 periodically makes processing calls to the transfer methods 51 of the web services server 46 using SOAP messaging over secure TCP/IP channels. In aggregate, the processing calls provide for the transfer client 24 to authenticate itself to the web services server 46 utilizing the authentication credentials 70 as stored in the authentication registry 77 and obtain a Session ID from the web services server 46 for use with subsequent processing calls to the transfer methods 51. The subsequent processing calls enable the transfer client 24 to: i) provide the web services server 46 with a list of printers which are available to the transfer client workstation (so that an administer may configure downloaded files for automated printing); ii) obtain parameters for upload events and download events scheduled for the transfer client 24; and iii) execute each scheduled upload event and download event.

In general, execution of an upload event comprises transferring a file found in the upload directory 63*a* by: i) encapsulating the file, as a binary large object (e.g. BLOB), within an XML data processing call; ii) transferring the data processing call to the web services server 46 within a Simple Object Access Protocol (SOAP) message wrapper using an SSL channel; iii) generating a subsequent data processing call instructing the web services server 46 to invoke an applicable process within the data processing module 55 for handling the file if the file is to be loaded into the application tables 319 by the web services server 46; iv) providing destination ownership information to the web services server 46 if the file is to be subsequently retrieved by a back end application such as the payment application server 13; v) and moving the uploaded file from the upload directory 63*a* to a processed files directory 63*c* to eliminate overwriting the file or transferring the same file to the web services server 46 a second time. A more detailed description of execution of an upload event and the interaction between the transfer client 24 and the web services server 46 is included herein.

In general, execution of a download event comprises: i) generating a data processing call instructing the web services server 46 to invoke an applicable process within the data processing module 55 for extracting data from the application tables 319 (FIG. 1*c*) and creating a file for download (if applicable); ii) generating data processing call(s) to web services server 46 to check if a file with applicable ownership information is available for download (whether newly created by the data processing module 55 or previously provided to the web services server 46 by the payment application server 13 or other back end application); iii) generating data processing call(s) to the web services server 46 to obtain the file as a BLOB through the SSL channel; and iv) saving the downloaded file in the download directory 63*b* for subsequent retrieval by the application 54. A more detailed description of execution of a download event and the interaction between the transfer client 24 and the web services server 46 is included herein.

Web Server

Returning to FIG. 1*a*, the web server 44 comprises a known web server front end 43 and a server application 45 encoded to the computer readable medium 42 and executed by the processor 40. The server application 45 comprises a data processing services module 48 and a configuration module 47.

The data processing services module 48 may be a menu driven application that provides sequences of web pages to a remote client system (such as browser 49*a* on workstation 58*a*, a mobile app 49*b* on a mobile tablet computer, or a mobile app 49*c* on a smart phone, FIG. 1*b*) to enable an operator of the remote client system 49*a*, 49*b*, 49*c* to navigate workflows related to the payments processed by the system 10. More specifically, the web pages provide data from application tables 319 of the database 118 and obtain data from the operator for writing to the application tables 319 in accordance with the business processes coded or configured into the data processing server module 48.

For example, the data processing server module 48 may provide web pages which enable the operator to entitle users, including unattended interfaces, enter payments, approve payments, post invoices, adjust invoices, post payments, request credit memos, and exchange other business process and financial data related to services provided by the system 10.

The configuration module 47 may be a menu driven application that provides sequences of web pages or data objects to a remote client system to enable an operator of the remote client system to configure remote transfer of files between the web services server 46 and a transfer client workstation 58*b* of a payer or vendor system (FIG. 1*b*).

More specifically, the configuration module 47 establishes a secure TCP/IP connection with the browser 49*a* or mobile app 49*b*, 49*c* and provides a menu driven sequence of web pages or data objects for: i) entitling a transfer client 24 (for download and installation on the transfer client workstation 58*b*); ii) configuring the periodic connection (polling parameters) between the transfer client 24 and the web services server 46; and iii) configuring the upload events and download events which the transfer client 24 will perform.

Entitling Transfer Client and Installation

Figure 2:
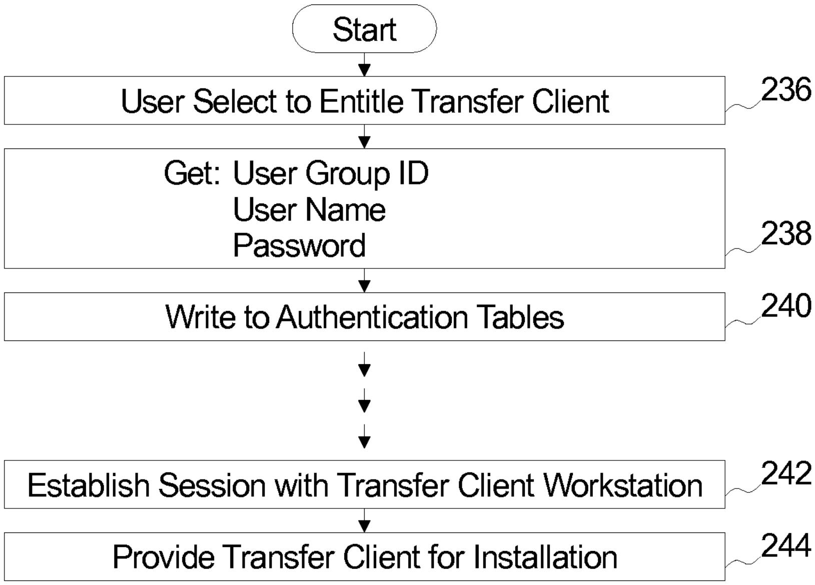
FIG. 2 is a flow chart representing exemplary operation of a configuration application in accordance with one embodiment of the present invention.

Turning to the flow chart of FIG. 2, exemplary steps performed by the configuration module 47 for entitling a transfer client and initially loading the transfer client 24 on a transfer client workstation 58*b* are shown.

After a TCP/IP connection has been established between the workstation and the server application 45 and after the administrator has been appropriately authenticated, the administrator may select a menu choice to entitle a transfer client. Step 236 represents the administrator selecting to entitle a transfer client.

Figure 1C:
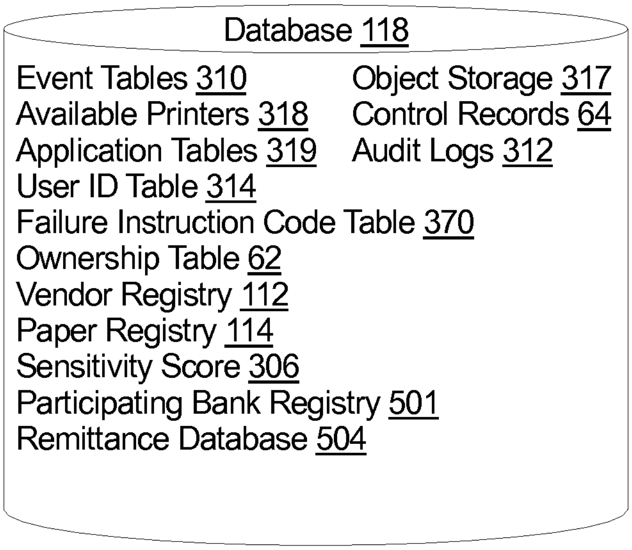
FIG. 1*c* is a diagram representing non transient data base structures in accordance with an aspect of the present invention.

Step 238 then represents the configuration module 47 obtaining initial configuration and authentication credentials 70 for the transfer client. The authentication credentials 70 include a user group ID value 71, a user ID value 72, and a password value 73. These may be obtained from the administrator or generated by the module 47. Step 240 represents writing the initial authentication credentials 70 to a user ID table 314 within the database 118 (FIG. 1*c*).

Figures 3, 4:
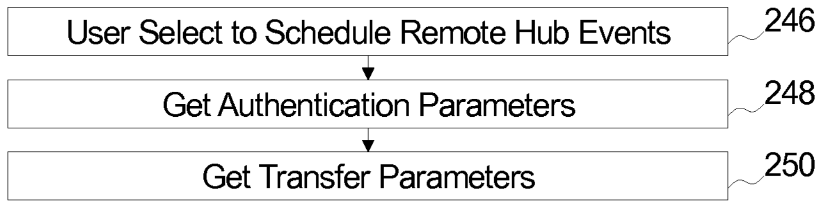
FIG. 3 is an exemplary User ID table in accordance with one embodiment of the present invention.
FIG. 4 is a flow chart representing exemplary operation of a configuration application in accordance with one embodiment of the present invention.

Turning briefly to FIG. 3, an exemplary user ID table 314 is shown. The user ID table 314 includes a plurality of records 352, each identified by a unique index 360 and each of which includes the authentication credentials 70 of a transfer client 24 configured for periodic file transfer with the web services server 46. Each record comprises a transfer client ID 362 which may comprise a separate user group ID field 354 and a user ID field 356 for storing the user group ID value 71 and user ID value 72 assigned to the transfer client 24 respectively. Additional fields include: i) a password field 358 for storing the then current password value 73 (in encrypted form) assigned to the transfer client 24, ii) an interval field 364 for storing a time period which defines a time interval at which the transfer client will make a sequence of processing calls to the web services server 46 to perform various actions which include authenticating itself and obtaining a new session ID, iii) a session time field 366 which stores a time stamp representing the most recent time at which the transfer client made such sequence of processing calls to the web services server 46 to obtain a new session ID; iv) an alert instruction field 367 which identifies an email address or other notification address to which notification is to be sent in the event that a transfer client 24 fails to make the sequence of processing calls to the web services server 46 to obtain a new session ID 83 within a timely manner (e.g within the period of time stored in the intervals field 364 following the time stamp 93 stored in the session time field 366, v) a session ID field 368 storing the most recent session ID 83 assigned to the transfer client 24; and vi) a status field 369 storing a "true" value if the transfer client 24 had been properly configured and authorized and storing a "false" value prior to authorization or if a logon attempt has been made with an incorrect password. If the status field 369 is set "false", the web services server 46 may deny access to the workstation 58*b* as will be discussed in more detail with respect to FIG. 9.

It should be appreciated that in the exemplary embodiment, the group ID value 71, user ID value 72, and password value 73 are initially written to the user ID table 314 at step 240 and the remaining fields are written during configuration or operation as discussed herein.

Returning to FIG. 2, after writing the group ID value 71, user ID value 72, and password value 73 to a record 352 of the user ID table 314, the TCP/IP connection with the administrator workstation 26 may be torn down and step 242 represents establishing a secure TCP/IP connection with the transfer client workstation 58*b*. More specifically, to download the transfer client 24 to the workstation 58*b*, the administrator utilizes a browser of the client workstation 58*b* (not shown) to establish the secure TCP/IP connection to the server application 45. It should be appreciated that when establishing the connection from the workstation 58*b*, the administrator authenticates the workstation using the authentication credentials 70 provided at step 238. After the TCP/IP connection is established, and the workstation/administrator authenticated, the transfer client 24 can be downloaded to the workstation 58*b* for installation by the operator. Step 244 represents the server application providing the code for the transfer client 24 to the workstation 58*b*.

In the exemplary embodiment, the code for the transfer client 24 may be executable code or interpretable code conforming with Active X Protocols or virtual machine protocols such that the transfer client 24 self installs at step 244. In the exemplary embodiment, installation includes writing the authentication credentials 70 to the authentication registry 77 so that the transfer client 24 may begin its periodic authentication to the web services server 46 and execute the applicable upload, download, and gateway events.

Configuration

In addition to entitling and installing the transfer client 24 in accordance with the steps of FIG. 2, the administrator also utilizes the browser 49*a* of the administrator workstation 58*a* or the mobile app 49*b*, 49*c* to configure operation of the transfer client 24—which includes configuring authentication parameters and file transfer parameters—including upload event parameters, download event parameters, and gateway event parameters.

The flow chart of FIG. 4 represents exemplary steps of configuring such parameters. It should be appreciated that these configuration steps may be performed initially upon entitling the client 24 and may be updated at times thereafter when appropriate.

To initiate configuration, the administrator establishes a secure TCP/IP connection with the server application 45 and selects an applicable menu choice for configuration. Step 246 represents receiving administrator selection of the menu choice to configure a transfer client 24.

Step 248 represents obtaining the periodic authentication parameters for the transfer client 24 and writing such authentication parameters to the user ID table 314 (FIG. 3) in the database 118. More specifically, step 248 represents providing web pages to the administrator workstation 58*a* (or the mobile app 49*b*, 49*c*) to enable the administrator to provide a time interval value 78 (typically one minute) for storage in the interval field 364 of the user ID table 314 and provide a notification address 79 for writing to the alert instruction field 367.

Returning to FIG. 4, step 250 represents configuring file transfer parameters within event tables 310 of the database 40. In the exemplary embodiment, the transfer client 24 obtains all if its instructions and parameters related to each upload event, download event, and gateway event from the web services server 46. More specifically, the administrator configures event parameters for each event within the event tables 310 of the database 40 using the configuration module 47 of the web server 44. The transfer client 24 retrieves such event parameters during the course of periodically authenticating itself to the web services server 46.

Turning briefly to FIGS. 5*a* and 5*b*, exemplary event tables 310 include an event key table 311 (FIG. 5*a*) and an event parameter table 316 (FIG. 5*b*).

The event key table 311 includes a plurality of records 313. Each record 313 associates an event with the transfer client 24 that is to execute the event. The transfer client 24 is identified by its group ID value 71 (stored in a group ID field 354) and its user ID value 72 (stored in a user ID field 356). The event is identified by an event key value 80 stored in an event key field 315. Each upload event and download event that a transfer client 24 is configured to perform is identified by an event key value 80 and is associated with the transfer client 24 in the event key table 311.

The event parameter table 316 includes a plurality of records 320. Each record includes an event key field 315, a parameter ID field 321, and a parameter value field 322. Each event parameter value is stored in a separate record 320 in the event parameter table 316 and is identified by an event parameter ID stored in the event parameter ID filed 321. Both the parameter ID field 321 and the parameter value field 322 are text fields such that the information stored therein can be assembled as an XML file for providing to a transfer client 24 (Step 170 of FIG. 25 discussed herein). The event to which the parameter associates is identified by its event key value 80 stored in the event key field 315.

Turning briefly to FIG. 5*c*, exemplary event parameters which may be associated with an upload event include: i) a file name 323 identifying the name of the file to be uploaded; ii) an upload directory path 324 identifying the upload directory in which the file is to be located; iii) a BLOB handling field 326 identifying whether the file, after uploading is to be left as a "message" for retrieval by another system or loaded by the web services server 46 into the application tables 319; iv) a destination group ID value 325 identifying a destination group to receive the file after transfer to the web services server—if the file is to be left as a "message" for retrieval by another system identified by the destination group value; v) BLOB loading rules 327 identifying a local data processing function and parameters for calling such local data processing function for loading the file into the application table 319 if handling by the web services server is applicable; vi) a status parameter 328 identifying the then current status of the event (such as whether the event has started, the time started, the event is completed, the time completed, the event was aborted, or the time aborted); vii) an email address 101 identifying an address to which a notification email is to be sent; iv) an email code 102 identifying conditions for sending the email notification;

Turning briefly to FIG. 6, exemplary email codes 102, as stored as records in an email codes table 102, include an email code 01 for no email notification (in which case the email address field 101 may be blank), an email code 02 for sending a notification email upon successful completion of the event; an email code 03 for sending an email upon failure to successfully complete the event; and an email code 04 for sending an email upon either success completion of, or failure to successfully complete, the event.

Turning briefly to FIG. 5*d*, exemplary event parameters which may be associated with a download event include: i) a file name 342 which identifies the name of the file to be downloaded; ii a download directory path parameter 343 which identifies the download directory 63*b* to which the file is to be written, iii) a BLOB generation parameter 345 which identifies whether the BLOB is to be generated by the data processing module 55 of the web services server 46 by reading data from the application table 319 (e.g. a data processing down load event) or whether the BLOB is a file previously provided to the web services server 46 by another system (e.g. a messaging event); iv) a profile ID 347 and extract rules 349 which are instructions for generating the BLOB based on data from the application tables 319 if the event is a data processing download event; v) a class 351 and offset 353 for identifying the BLOB in the ownership tables 62; vi) a status parameter 355 identifying the then current status of the event (such as whether the event has started, the time started, the event is completed, the time completed, the event was aborted, or the time aborted); vii) an email address 101 identifying an address to which a notification email is to be sent; viii) an email code identifying conditions for sending the email notification; ix) a printer field 359; and x) a print code field 357. The print code field 357 stores and indication of whether a file should automatically be sent to a printer upon download. The printer field 359 identifies the specific printer to which the file should be sent.

Turning briefly to FIG. 7, the available printers table 318 includes a plurality of records 374. Each record associates a printer (identified by its printer ID value 81 in a printer ID field 378) with the group ID value 71 and user ID value 72 of a transfer client 24. As will be discussed, each transfer client 24 periodically updates the available printers table 318 such that an administrator may configure download events in a manner that provides for the transfer client 24 to automatically send to the downloaded filed to an available printer.

Mobile App Server

The mobile application server 56 comprises a mobile application server 57 encoded to the computer readable medium 42 and executed by the processor 40. The mobile application server 57 may be a menu driven application that, provides data objects to customized applications operating on remote mobile client systems 49*b*, 49*c* of payers and vendors (FIG. 1*b*) such that the data may be rendered on the remote systems and enable an operator of the remote mobile system to navigate workflows related to the payments processed by the system 10 in a manner similar to that discussed with respect to the web server 44.

For example, the mobile application server 57 may provide objects which drive the remote application to enable the operator to entitle users, including unattended interfaces, enter payments, approve payments, post invoices, adjust invoices, post payments, request credit memos, and exchange other business process and financial data related to services provided by the system 10.

Web Services Server

The web services server 46 includes a web services front end 59 and a transfer server 60 coded to the computer readable medium 42 and executed by the processor 40.

The web services front end 59 may be a known web services front end which utilizes the simple object access protocol (SOAP) for exchanging XML messages with remote systems (and in particular a transfer client 24 operating on the transfer client workstation 58*b* (FIG. 1*b*) using secure socket connections (e.g. SSL Connections) over the Internet 20.

The transfer server 60 may, in combination with the web services front end 59, publish a WSDL document describing the data processing services (e.g. transfer methods 51) provided by the transfer server 60 and, upon receiving a method call from a remote system, execute the applicable transfer method 51 and thereby provide the data processing service to the remote system making the method call.

The transfer methods 51 (which will be discussed in more detail with reference to FIG. 8) in the aggregate enable a remote unattended system making method calls to the web services server 46 to: i) perform functions similar to those performed by an operator of a remote browser systems using the application server module 45 of the web server 44; and ii) exchange files (or messages) with a back end application server such as the payment application server 13.

More specifically with respect to exchanging payment instruction files and/or remittance information with the payment server 13, the transfer methods 51 enable a remote system to: i) upload files (such as payment instruction files) to the web services server 46 and invoke automated handling of the file by a data processing module 55 of the transfer server 60—which writes data (such as payment records) from the uploaded file to the application tables 319; and ii) invoke reading of data (such as remittance records from the remittance database) or from other application tables 319 and creation of a file by the data processing module 55 for downloading to the remote system by the web services server 46.

Further, the transfer methods 51 enable a remote system to: i) upload files (such as payment instruction files) to the transfer server 60 for storage as binary objects within object storage records 317 of the database 40—for subsequent retrieval by the payment application server 13; and ii) download files or messages (such as remittance files or records) from the object storage records 317 which were previously provided to the web services server 46 by the payment application server 13.

Web Services Server

As discussed, the web services server 46 may comprise a web services module 58 and a transfer server 60. The web services module 58 may be a known web services front end which utilizes the simple object access protocol (SOAP) for exchanging XML messages with remote systems (and in particular the transfer client 24 of the transfer client workstation 58*b*) using SSL channels over the Internet 20.

The transfer server 60 may, in combination with the web services module 58 publish a WSDL document describing the transfer methods 51—and, upon being called by a transfer client 24, execute such methods. Turning briefly to FIG. 8, an exemplary listing of the transfer methods 51 which are performed by the transfer server 60 are shown. These methods, in the aggregate, provide for the automated file transfer systems as discussed above. The steps executed to perform each transfer method 51 is discussed with respect to one of the flow charts of FIGS. 9 through 21 respectively and operation of the transfer client 24 in calling such methods to perform the file transfers is discussed later herein.

Check Status Method

Figure 9:
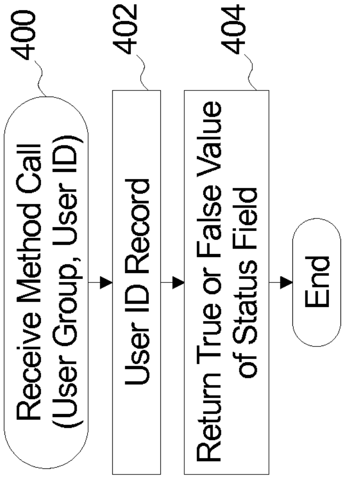

The flow chart of FIG. 9 represents a transfer method 51 called Check Status which is executed by the web services server 46 in response to receiving a check status method call from a transfer client 24. Step 400 represents receipt of the parameters of the method call which include a user group ID value 71 and a user ID value 72 assigned to the transfer client (during configuration discussed later herein).

Step 402 represents retrieving the record 352 from the User ID table 314 which corresponds to the group ID value 71 and the user ID value 72 and step 404 represents returning the "True" or "False" value of the status field 369 of the record 352.

As will be discussed in more detail herein, if the value of the status field 369 is false, the transfer client 24 either has not been authorized or has attempted to authenticate with an incorrect password. In either case, the transfer client 24 is not permitted to interact with is the web services server 46 until such time as the value of the status field 369 has been returned to true.

Log-On Method

Figure 10:
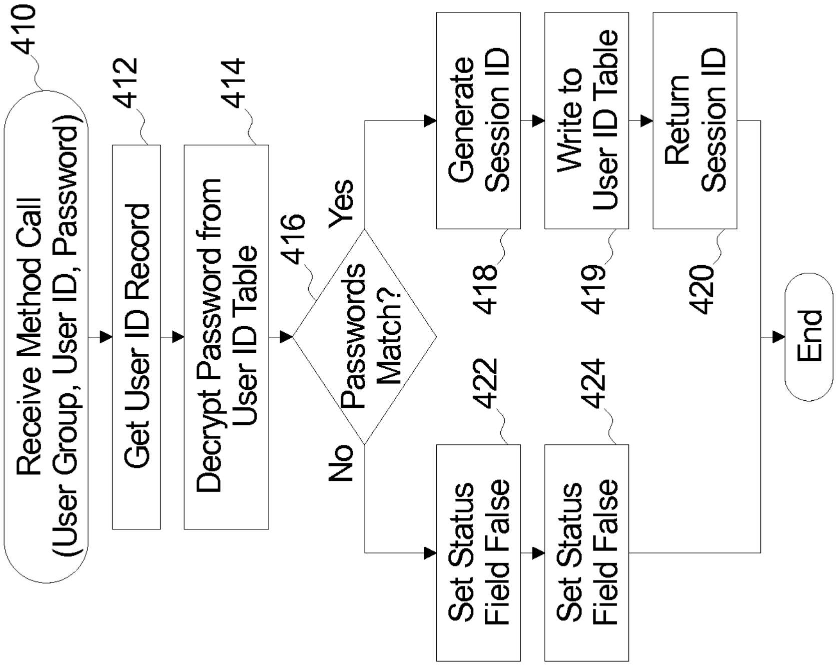

The flow chart of FIG. 10 represents a transfer method 51 called Log-On which is executed by the web services server 46 in response to receiving a Log-On method call from a transfer client 24. Step 410 represents receipt of the parameters of the method call which include the group ID value 71, the user ID value 72, and the then current password value 73.

Step 412 represents retrieving the encrypted password value 82 from the record 352 of the user ID table 314 which corresponds to the group ID value 71 and the user ID value 72.

Step 414 represents decrypting the encrypted password value 82. In the exemplary embodiment, the encrypted password value 82 is generated using a one way ciphering technique wherein the password value itself is the key for deciphering the encrypted password value 82. As such, when a password value 73 is provided by the transfer client 24, it may be used as a key for deciphering the encrypted password value 82. If the password value 73 matches the deciphered value, then the password provided by the transfer client 24 matches the original password which was encrypted into the encrypted password value 82 and stored in the user ID table 314.

Step 416 represents determining whether the password value 73 provided by the transfer client 24 matches the result of deciphering the encrypted password value 82. If there is a match, a Session ID 83 is generated at step 418.

Step 419 represents writing the Session ID 83 to the Session ID field 368 of the user ID table 314 and writing a time stamp (representing the time the Session ID was generated) to the Session Time field 366 of the user ID table 314. Step 420 represents returning the Session ID 83 to the transfer client 24.

Alternatively, if the password value 73 provided by the transfer client 24 does not match the result of deciphering the encrypted password 82 at decision box 416, the status field 369 of the record 352 is set to "False" at step 422 and notification is sent to the notification address 79 as stored in the alert instruction field 367 of the record 352 at step 424. In the exemplary embodiment, the notification address 79 will be an email address to which certain information about the failure is sent. The information may include the group ID value 71 and the user ID value 72.

Get Password Method

Figure 11:
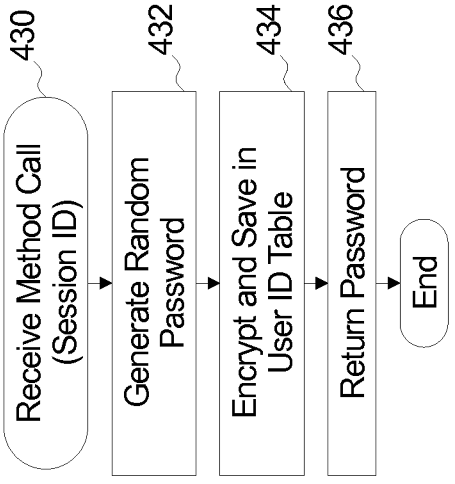

The flow chart of FIG. 11 represents a transfer method 51 called Get Password which is executed by the web services server 46 in response to receiving a Get Password method call from a transfer client 24. Step 430 represents receipt of the parameters of the method call which include the Session ID 83.

Step 432 represents generating a random password value 73. At step 434 the password value 73 is encrypted to generate an encrypted password value 82 and saving the encrypted password value 82 in the password field 358 of the record 352 in the User ID table 314 which corresponds to the Session ID 83.

Step 436 represents returning the randomly generated password 73 to the transfer client 24.

Send Printers Method

Figure 12:
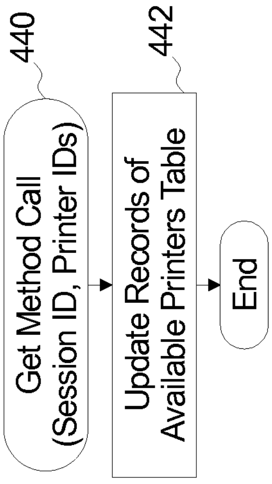

The flow chart of FIG. 12 represents a transfer method 51 called Send Printers which is executed by the web services server 46 in response to receiving a Send Printers method call from a transfer client 24. Step 440 represents receipt of the parameters of the method call which include the Session ID 83 and the Printer ID value 81 of each printer available to the transfer client workstation 58*b*. Step 442 represents updating the records 374 of the available printers table 318 to reflect printers then currently available to the transfer client workstation 58*b*.

Retrieve Active Event Keys Method

Figure 13:
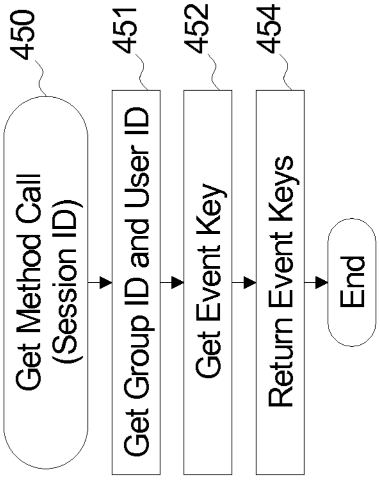

The flow chart of FIG. 13 represents a transfer method 51 called Retrieve Active Event Keys which is executed by the web services server 46 in response to receiving a Retrieve Active Events Keys method call from a transfer client 24. Step 450 represents receipt of the parameters of the method call which include the Session ID 83.

Step 452 represents retrieving the group ID value 71 and the user ID value 72 associated with the Session ID 83 from the User ID table 314.

Step 454 represents retrieving each Event Key value 80 associated with the group ID value 71 and the user ID value 72 in the event key table 311 (FIG. 5*a*).

Step 454 represents returning each retrieved event key value 80 to the transfer client 24.

Read Event Method

Figure 14:
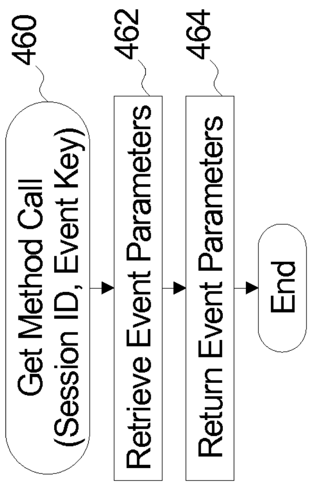

The flow chart of FIG. 14 represents a transfer method 51 called Read Event method which is executed by the web services server 46 in response to receiving a Read Event method call from a transfer client 24. Step 460 represents receipt of the parameters of the method call which include the Session ID 83 and an Event Key value 80.

Step 462 represents retrieving the event parameters (e.g. each parameter ID and its associated parameter value) associated with the event on the event parameter table 312 (FIG. 5*b*).

Step 464 represents returning the event parameters to the transfer client 24.

Update Event Method

Figure 15:
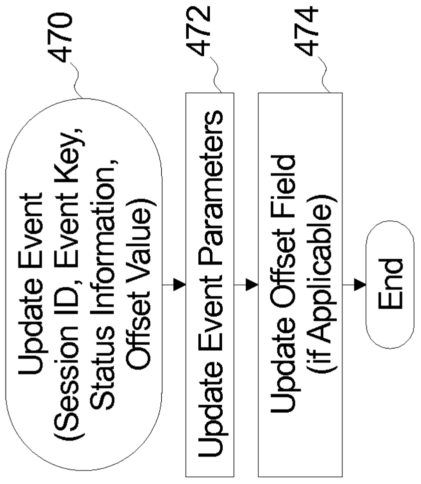

The flow chart of FIG. 15 represents a transfer method 51 called Update Event which is executed by the web services server 46 in response to receiving an Update Event method call from a transfer client 24. Step 470 represents receipt of the parameters of the method call which include the Session ID 83, an Event Key value 80, Status Information, and an Offset Value. In the exemplary embodiment, the status information may be identification of a parameter ID 321 and a parameter value 322 for storage in the event parameter table 316. It is useful for the transfer client 24 to be able to update parameter values during execution of an event to reflect the processes performed. The offset value is a value representing an increment such that the number of time that an event has been processed can be tracked. This is useful for avoiding duplicate upload events, download events, or gateway events for the same file.

Step 472 represents updating the event parameter table 316 as applicable to reflect the status information provided in the Update Event method call.

Step 474 represents updating the offset value as stored in the event parameter table 316 to reflect the Offset Value provided in the Update Event method call.

Create BLOB Method

Figure 16:
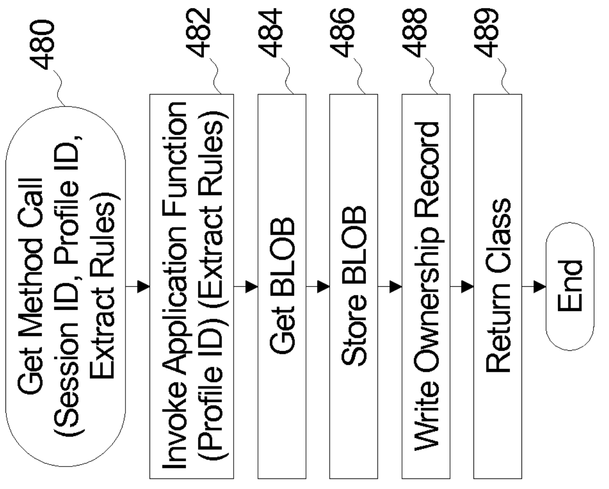

The flow chart of FIG. 16 represents a transfer method 51 called Create BLOB method which is executed by the web services server 46 in response to receiving a Create BLOB method call from a transfer client 24. Step 480 represents receipt of the parameters of the method call which include the Session ID 83, a Profile ID 347, and extract rules 349. In the case of remittance information for download to a vendor's unattended interface module, the extract rules may require a date range (an event parameter) and ID of a vendor such that remittance records only for that vendor and only within the date range are extracted in accordance with the extract rules.

Step 482 represents invoking a local function (e.g. a function executed by the data processing module 55 of the transfer server 60) which corresponds to the to the profile ID 347 to retrieve applicable data from the application tables 319 and providing the extract rules 349 to a file building system which formats the retrieved data in a file format compatible with (e.g. for loading into) the business process application server 18. For example, in a remittance system, the profile ID 347 may indicate a data processing method and a group of parameters which result in the data processing module retrieving remittance record within a certain date range. The extract rules 349 may identify to the file building system that the remittance and associated data retrieved from the application tables should be formatted as a particular type of EDI or other file format recognized by the back end application such as the payment system 13.

Step 484 represent obtaining the BLOB from the data processing module 55 and step 486 represents writing the BLOB to the object storage 317.

Step 488 represents creating an ownership record 94 in an ownership table 62 and populating each of the fields for which a value is available.

Step 489 represents returning a class value to the transfer client 24 making the processing call to the web services server.

Turning briefly to FIG. 22, an exemplary ownership table 62 is shown. The ownership table 62 comprises a plurality of records, each of which is associated with a BLOB stored in the object storage 317.

The fields of the ownership table 62 comprise a BLOB ID field 85, a class field 86, a destination group ID field 87, and an offset field 88. The BLOB ID field 85 stores a BLOB ID value 89 which identifies a particular BLOB stored in the object storage 317. The class field 86 stores a class value 90 which identifies the type of data within the BLOB which, in the exemplary embodiment may be a file name extension. The destination group ID field 87 stores a destination group ID value 91 which identifies the group ID value of another transfer client 24 of a remote system or the back end application server 38 which may retrieve the BLOB. The offset field 88 stores an offset value 92 which is an increment value assigned to the BLOB and is useful for preventing duplicate downloading of the same BLOB.

Check for Available BLOB (CFAB) Method

Figure 17:
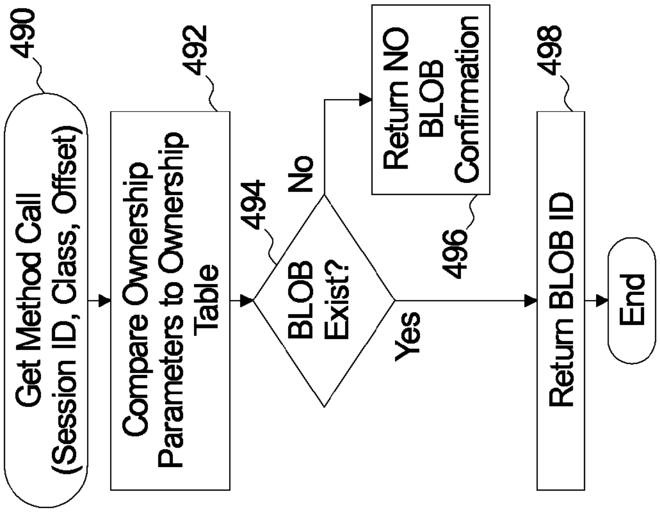

The flow chart of FIG. 17 represents a transfer method 51 called CFAB method which is executed by the web services server 46 in response to receiving a CFAB method call from a transfer client 24.

Step 490 represents receipt of the parameters of the method call which include the Session ID 83, a Class value 90, and an Offset Value 92.

Step 492 represents comparing ownership parameters to values within the ownership table 62 to determine whether a BLOB exists for downloading. More specifically, i) the class value 90 provided in the method call is compared to the class value 90 of each record 94 of the ownership table 62 to determine if a BLOB with a class value matching the class value provided in the method call exists; and ii) the group ID value 71 (which associates with the session ID value 83 in the user ID table 314) is compared to the destination group ID value 91 of each record 94 of the ownership table 62 to determine if a BLOB with a destination group ID value 91 matching the group ID value 71 of the transfer client 24 exists.

In either case, the offset value 92 provided in the method call is compared to the offset value 92 in the ownership table 62. An offset value 92 in the ownership table 62 that is higher than the offset value 92 provided in the method call indicates that the BLOB has not yet been downloaded and therefore exists for downloading.

If a BLOB exists for downloading as determined at decision box 494, the BLOB ID 89 from the record 94 is returned to the transfer client 24 at step 498. If no BLOB meeting the ownership requirements exists, a "NO BLOB" confirmation is returned to the transfer client 24 at step 496.

Download BLOB Method

Figure 18:
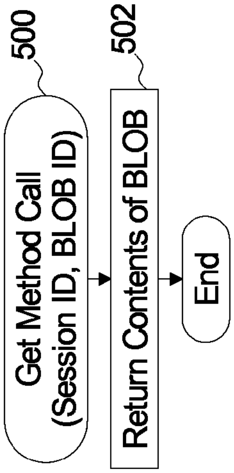

The flow chart of FIG. 18 represents a transfer method 51 called Download BLOB method which is executed by the web services server 46 in response to receiving a Download BLOB method call from a transfer client 24.

Step 500 represents receipt of the parameters of the method call which include the Session ID 83 and a BLOB ID 89.

Step 502 represents retrieving the BLOB corresponding to the BLOB ID 89 from the object storage 317 and providing the contents of the BLOB to the transfer client 24.

Upload File Method

Figure 19:
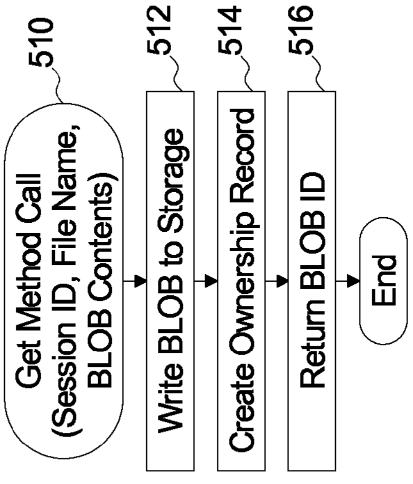

The flow chart of FIG. 19 represents a transfer method 51 called Upload BLOB method which is executed by the web services server 46 in response to receiving an Upload BLOB method call from a transfer client 24.

Step 510 represents receipt of the parameters of the method call which include the Session ID 83, a file name, and the contents of the BLOB.

Step 512 represents writing the BLOB to the object storage 317 and step 514 represents creating and populating an ownership record 94 in the ownership table 62.

Step 516 represents returning the BLOB ID to the transfer client 24 making the processing call to the web services server 46.

Set Destination BLOB Owner Method

The flow chart of FIG. 20 represents a transfer method 51 called Set Destination BLOB Owner method which is executed by the web services server 46 in response to receiving a Set Destination BLOB Owner method call from a transfer client 24.

Step 520 represents receipt of the parameters of the method call which include the Session ID 83, a BLOB ID 89, and destination user group 91.

Step 522 represents writing modifying the ownership record 94 associated with the BLOB ID 89 in the ownership table 62 by writing the destination user group ID 91 provided in the method call to the destination group ID field 87 of the record 94.

Process BLOB Method

The flow chart of FIG. 21 represents a transfer method 51 called Process BLOB method which is executed by the web services server 46 in response to receiving a Process BLOB method call from a transfer client 24.

Step 530 represents receipt of the parameters of the method call which include the Session ID 83, a BLOB ID, a Profile ID, and Loading Rules.

Step 532 represents invoking an application function of the data processing module 55 for loading the contents of the BLOB into the application tables 319 in accordance with the loading rules. Both identification of the application function and the loading rules are as set forth in the event parameter table 316 and are provided by the transfer client 24 as part of the method call.

Web Services Server Monitoring of Polling

In addition to providing the methods discussed with respect to FIGS. 9 through 21, the transfer server 60 also includes a session ID monitoring process 53 for monitoring the polling of each transfer server 60 and, if a transfer server fails to periodically contact the web services server 46 to update its password and events, the web services server 46 can generate a failure to poll alert.

Referring to FIG. 23, the session ID monitoring process 53 monitors the session time field 366 and the interval field 364 of each record 352 of the User ID table 314. Such monitoring is represented by step 231. In the event that the current time exceeds the time stamp 93 stored in the session time field 366 by more than the time interval 78 stored in the interval field 364, the transfer client 24 (identified by group ID 71 and user ID 72 of the record 352) has failed to authenticate itself and obtain a Session ID (in accordance with the flowchart of FIG. 25 as will be discussed later herein) within the proper interval time. Determining that such failure exists is represented by decision box 233.

In response to such failure, the web services server 46 will generate an alert email to the notification address 79 as stored in the alert instruction field 367 at step 235.

Transfer Client

Returning to FIG. 1*b*, as discussed the transfer client workstation 58*b* may also be a known networked computer system with an operating system 75, IP networking hardware and software (not shown), and the transfer client application 24.

The operating system 75 may manage the directory system 74 and the authentication registry 77. In the exemplary embodiment, the operating system may be one of the operating systems available from Microsoft® under its Windows® trade name or another suitable operating system providing the structures and functions useful for implementing the present invention.

The transfer client 24 includes authentication function 25 and, when applicable event parameters are obtained from the web services server 46, includes spawned upload processes 27, spawned download processes 29, and spawned gateway processes 31.

In general, the authentication function 25 is periodically performed by the transfer client 24 to authenticate itself to the web services server 46, update its password value 73, obtain a session ID 83, update the available printers table 318, and obtain event parameters for upload, download, and gateway events. Each of the spawned processes 27, 29, and 31 is built by the transfer client 24 utilizing event parameters received from the web services server 46 for the purpose of executing the event. Each of the authentication function 25 and the spawned processes 27, 29, and 31 make calls to local processes 23 which are shown, in conjunction with the required process parameters, in the table of FIG. 24.

Authentication Function

Figure 25:
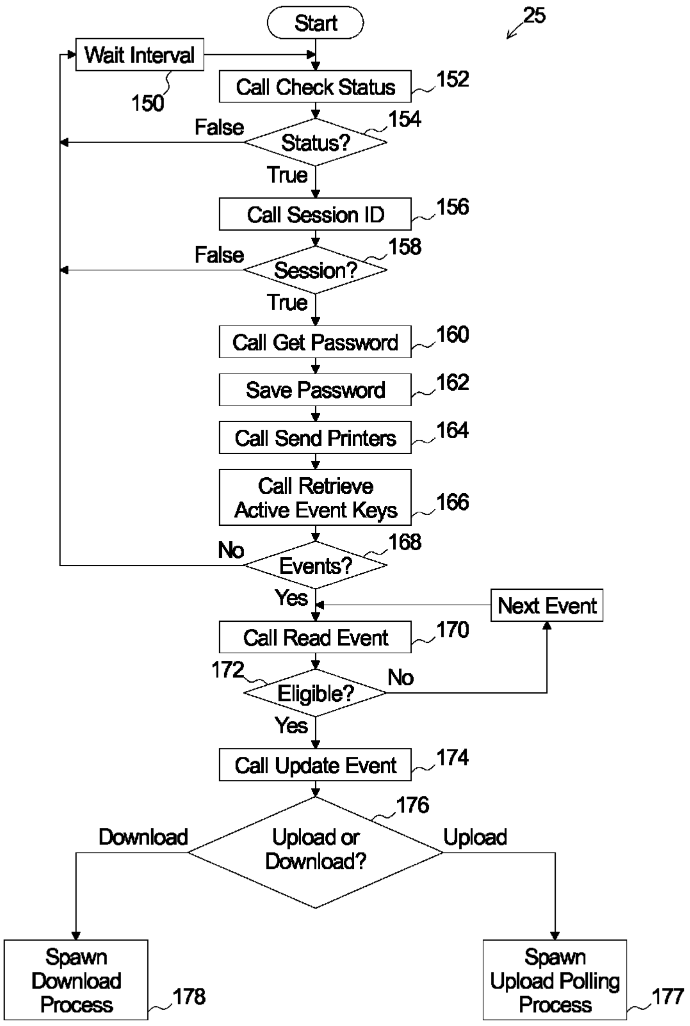
FIG. 25 is a flow chart representing exemplary authentication function of a transfer client in accordance with one embodiment of the present invention.

The flow chart of FIG. 25 represents exemplary operation of the authentication function 25 of the transfer client application 24. The authentication function 25 initially runs upon loading of the transfer client 24 onto the workstation 58*b* and periodically thereafter as defined by the interval time value 78 stored in the user ID table 314.

Step 152 represents the transfer client application 24 executing a local process 23 called Check Status at step 152. Check Status makes a method call to a transfer method 51 operated by the web services server 46. The transfer method 51 is also called "Check Status". The method call is formatted as an XML message and transferred to the web services server 46 within a SOAP message wrapper over an SSL channel.

The local function provides each of the group ID value 71 and the user ID value 72 (from the authentication registry 77) to the web services server 46 as part of the method call. In response, the web services server 46 executes the Check Status Method as discussed with respect to FIG. 9 which includes looking up the record 352 corresponding to the group ID value 71 and user ID value 72 in the user ID table 314 to determine if the transfer client 24 is active. The "True" or "False" value in the status field 369 of the record 352 is returned to the transfer client.

If the status value is "False", at decision box 154, the transfer client 24 waits the applicable time interval 78 before again making the Check Status Method call to the web services server 46 at step 152.

If the status value is "True", at decision box 154, the transfer client 24 executes a local process 23 called Session ID at step 156. Session ID makes a method call to a transfer method 51 operated by the web services server 46. The transfer method 51 is also called "Session ID". The local process 23 provides each of the group ID value 71, the user ID value 72, and the password value 73 (from the authentication registry 77) to the web service server 46 as part of the method call. In response web services server executes its Session ID Method as discussed with respect to FIG. 10 and returns a Session ID 83 if the transfer client 24 is properly authenticated.

If a Session ID 83 is not obtained, as determined by decision box 158, the transfer client 24 again waits the applicable time interval 78 before again making the Check Status Method call to the web services server 46 at step 152.

If a Session ID 83 is obtained, the transfer client 24 executes a local process 23 called Get Password at step 160. Get Password makes a method call to a transfer method 51 operated by the web services server 46. The transfer method 51 is also called "Get Password". The local process provides the Session ID 83 as a parameter of the Get Password method call. In response web services 46 executes a Get Password method as discussed with respect to FIG. 11 and returns a randomly generated password 73 to the transfer client 24.

In response to receiving the randomly generated password 73, the transfer client 24 executes a local function called Save Password at step 162 to save the randomly generated password 73, in encrypted form, in the authentication registry 77.

Step 164 represents the transfer client 24 executing a local process 23 called Send Printers. Send Printers makes a method call to a transfer method 51 operated by the web services server 46. The transfer method 51 is also called Send Printers. The local process provides the Session ID 83 as well as the printer ID value 81 of each printer accessible to the transfer client workstation 58*b* as parameter of the Send Printer method call. In response the web services server 46 executes its Send Printers method as discussed with respect to FIG. 12 for updating the available printers table 318.

Step 166 represents the transfer client 24 executing a local process 23 called Retrieve Active Event Keys. The local process makes a method call to a transfer method 51 operated by the web services server 46. The transfer method 51 is also called Retrieve Active Event Keys. The local process provides the Session ID 83 as the parameter of the Retrieve Active Event Keys method call. In response, the web services server 46 executes the Retrieve Active Event Keys Method as discussed with respect to FIG. 13 and returns the event key value 80 for each event in the event key table 311 associated with the transfer client 24.

If no event key values 80 are returned, as determined at decision box 168, the transfer client 24 waits the time interval 78 before again sending a Check Status method call at step 150. If at least one Event Key value 80 is returned, each event is performed in sequence.

Step 170 represents executing a local process 23 called Read Event. Read Event make a method call to a transfer method 51 operated by the web services server 46. The transfer method 51 is also called Read Event. The local function provides the Session ID 83 and the event key value 80 as parameters of the method call. In response, the web services server 46 executes its Read Event method as discussed with respect to FIG. 14 and returns all of the parameters associated with the event key value 80 in the event parameter table 316. The values are returned as an XML file with the parameter ID 321 being the XML tag and the parameter value 322 being associated with the tag.

Decision box 172 represents determining whether the event associated with the Event Key value 80 is eligible to run. For example, parameters of the event parameter table 316 may identify certain time periods or certain frequencies that events may be ran. If the event is outside of such time period or frequency parameters, the event is considered ineligible to run. If not eligible, the next event key value 80 is selected and the local process 23 Read Event is executed for such next event key value 80 at step 170.

Step 174 represents executing a local process 23 called Update Event. Update Event makes a method call to a transfer method 51 operated by the web services server 46. The transfer method 51 is also called Update Event. The local function provides the Session ID 83, event key value 80, status information (such as the time the event was started, the time the event was completed, or the time the event was aborted) and an is offset value as parameters of the method call. The purpose of this Update Event processing call is to update applicable fields in the event parameter table 316 to indicate the then current status of the event. In response, the web services server 46 will execute its Update Event Method as discussed with respect to FIG. 15 for purposes of updating the applicable status records of the event parameters table 316.

The event associated with the event key value 80 may be any of a download event, an upload event, or a gateway event. The type of event is identified by a parameter value returned at step 170. Step 176 represents determining whether the event is an upload event or a download event. If the event is an upload event, an upload polling process 27 is spawned at step 177. If the event is a download event, a download process 29 is spawned at step 178.

Spawning Download Process

Figure 26:
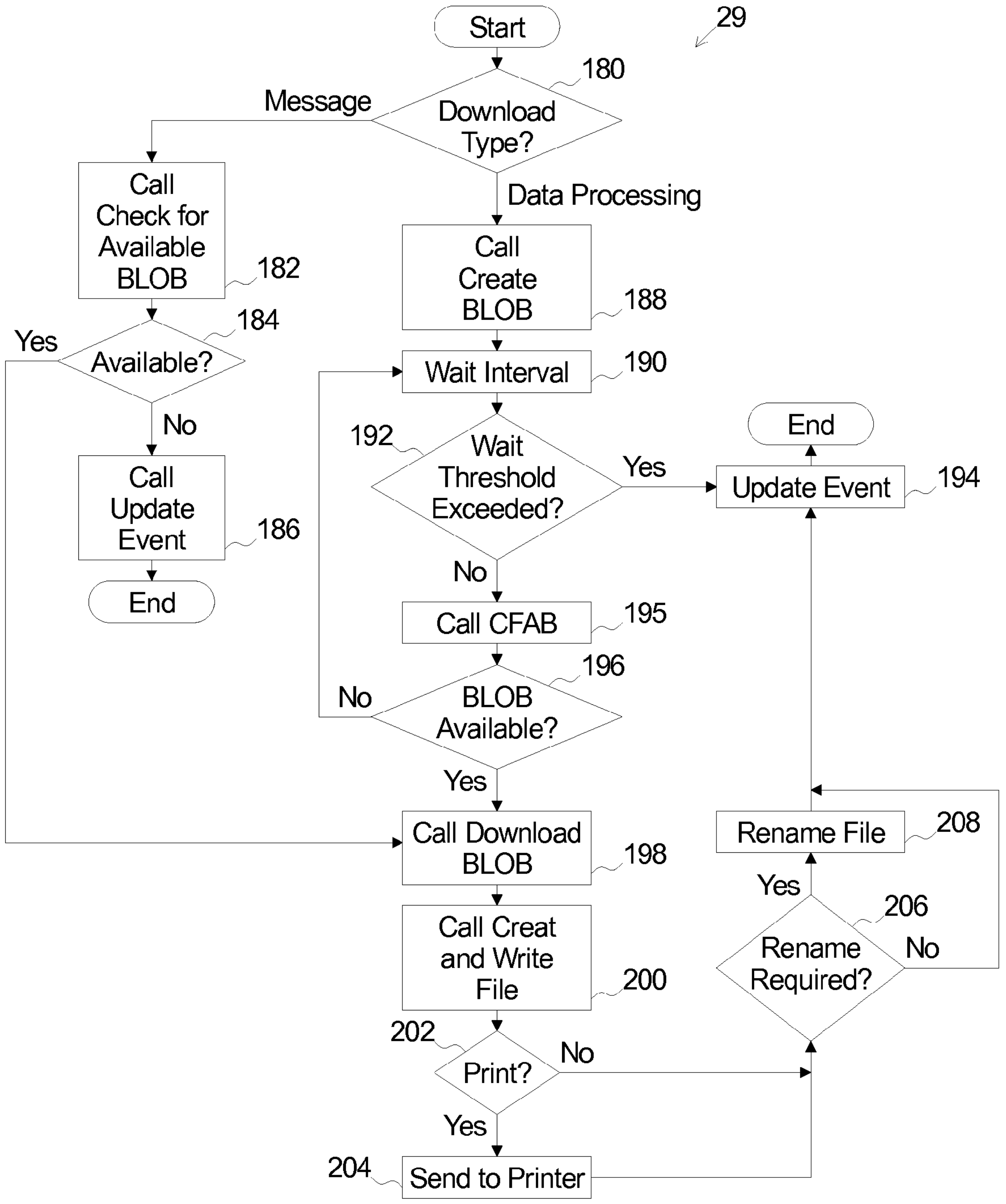
FIG. 26 is a flow chart representing an exemplary download process in accordance with one embodiment of the present invention.

The flow chart of FIG. 26 represents exemplary operation of a spawned download process 29.

Step 180 represents determining the type of the download event. The download event may be either a message event or a data processing event. The type of event is identified by the event type parameter 344 from the event parameter table 316 and received at step 170.

If the event is a message event, the transfer client 24 executes a local process 23 called Check For Available BLOB. The local function makes a method call to a transfer method 51 operated by the web services server 46. The transfer method 51 is also called Check For Available BLOB. The local process provides the Session ID 83, a class value 90, and offset value 92 as parameters of the method call. In response, the web services server 46 executes its Check For Available BLOB method as discussed with respect to FIG. 17 and returns a BLOB ID 89 if a BLOB meeting the criteria is available and not yet downloaded.

If no BLOB is available, as determined at decision box 184, the transfer client 24 again executes the local process 23 called Update Event at step 186—for the purpose writing an indication that the event is complete to applicable records of the event parameter table 316.

Following execution of Update Event, the transfer client again returns to step 170 where the function Read Event is executed for the next Event Key value 80 provided by the web services server 46.

If a BLOB is available at decision box 184, the transfer client 24 executes a local process 23 called Download BLOB. The local process 23 makes a method call to a transfer method 51 operated by the web services server 46. The transfer method 51 is also called Download BLOB. The local function provides the Session ID 83 and BLOB ID 89 as parameters of the method call. In response, the web services server 46 executes its Download BLOB Method as discussed with respect to FIG. 18 and returns the contents of the BLOB associated with the BLOB ID 89.

Step 200 represents the transfer client 24 executing a local process 23 called Create And Write File. Create And Write File stores the BLOB using the file name parameter 342 in the in the download directory 50*b* identified by the download directory path parameter 343—both associated with the event in the event parameter table 316 and provided to the transfer client in response to the Read Event method call at step 170.

Step 202 represents determining whether the file just downloaded should be queued for automatic printing. The event parameters received at step 170 may include an indication that the file should be automatically printed (e.g. print code 357) and an indication of one of the available printers (e.g. printer 359). If yes at step 202, the transfer client 24 executes a local function called Send To Printer at step 204. The local function retrieves the printer ID from the parameters provided at step 170 and queues the file for the printer.

Following execution of Send to Printer, or upon determining that the downloaded file is not to be sent to a printer, the transfer client 24 determines whether the Event Parameters require renaming the file as represented by decision box 206.

If yes, step 208 represents the transfer client 24 executing a local process 23 called Rename File. The parameters of Rename File are the old file name and the new file name. The local process 23 renames the file with the old file name to the new file name.

Following renaming of the file at step 208 or following determining that the file is not to be renamed at step 206, the local process 23 Update Event is again called at step 194.

Returning to decision box 180, if the download type is a data processing download, the transfer client 24 executes a local process 23 called Create BLOB. The local process makes a method call to a transfer method 51 operated by the web services server 46. The transfer method 51 is also called Create BLOB. The local process provides the Session ID 83, Profile ID 347, and extract rules 349 as parameters of the method call. In response the web services server 24 will execute its Create Blob Method as discussed with respect to FIG. 16.

Following the Create BLOB method call, the transfer client 24 waits a time interval, at step 192, while the web services server 24 executes its Crate Blob Method. If at decision box 192, the total time elapsed since the Create BLOB method call was made exceeds a threshold, the transfer client effectively aborts the download and proceeds to step 194 where the Update Event function is executed to write a status to the applicable status records of the event parameters table 316 indicating that the event was aborted.

If at decision box 192 the total time elapsed since the Create BLOB method call was made had not exceeded the threshold, the transfer client 24 executes the local Check For Available BLOB function at step 195 (as previously discussed with respect to Step 182). In response, the web services server 46 returns a BLOB ID if a BLOB meeting the criteria is available and not yet downloaded. Presumably the BLOB was created in response to the Create BLOB method call and is now available.

If no BLOB is available, as determined at decision box 196, the transfer client 24 returns to step 190 to again wait for a predetermined time interval.

If a BLOB is available at decision box 196, the transfer client 24 executes the local Download BLOB function at step 198 as previously discussed.

Spawned Upload Process

Figure 27B:
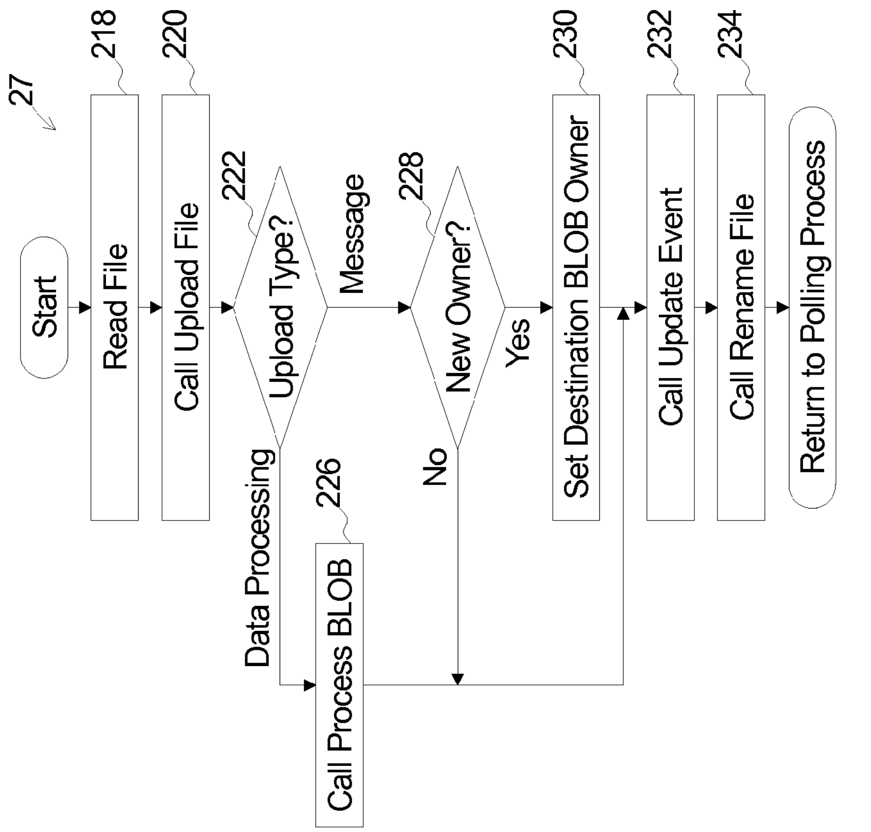
FIG. 27*b* is a flow chart representing an exemplary upload process in accordance with one embodiment of the present invention.
Figure 27A:
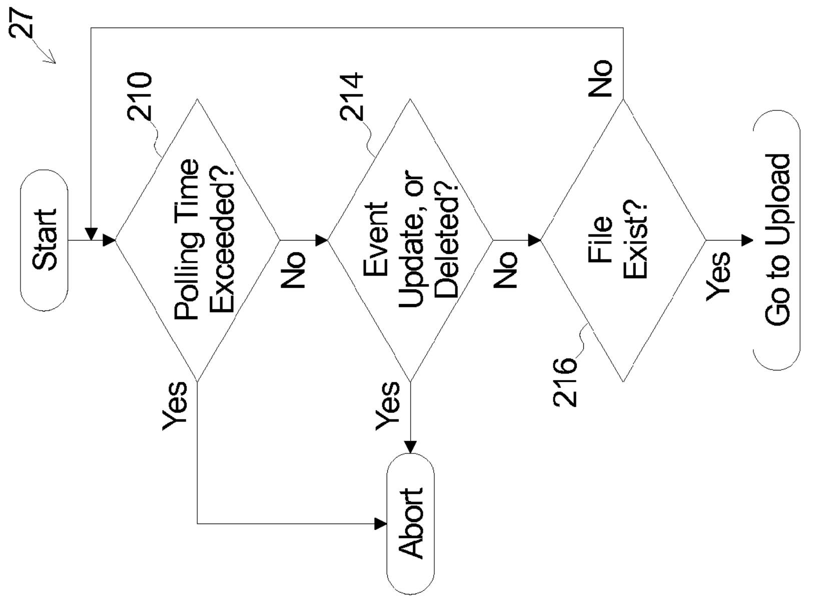
FIG. 27*a* is a flow chart representing an exemplary upload polling process in accordance with one embodiment of the present invention.

The flow charts of FIGS. 27*a* and 27*b* represents steps of a spawned upload is process 27. In the exemplary embodiment, the upload process 27 will continually search the upload directory 50*a* for an applicable file and, if the file is located, proceed to steps which upload the file to the web services server. The flow chart of FIG. 27*a* represents the upload process continually searching (e.g polling) the upload directory and the flow chart of FIG. 27*b* represents uploading the file to the web services server 46.

Decision box 210 represents determining whether a polling time threshold has been exceeded. The spawned upload process 27 will only continue to search the upload directory 50*a* for a limited period of time referred to as the polling time threshold. If this has been exceeded, the polling process is aborted.

If the polling time threshold has not been exceeded at decision box 210, the polling process determines whether the event has been updated or deleted at step 214. Determining whether the event has been updated or deleted may include making another Read Event method call to the web services server 46 to determine whether event parameters have been changed or the event deleted. If the event has been updated or deleted, the process is aborted polling process aborts. The event, to the extend updated is processes as a "new" event beginning with step 172 of the flow chart of FIG. 25.

If the event has not been updated or deleted, the process determines whether the applicable file (as identified by the file name parameter 323 in the event parameter table 316) exists in the applicable upload directory 50*a* (as identified by the upload directory path parameter 324 in the event parameter table 316) at decision box 216. If the file does not exist, the polling process again returns to decision box 210 to determine whether the polling time threshold has been exceeded. If the file exists at decision box 216, the transfer client 24 begins execution of an upload process as shown in FIG. 27*b*.

Turning to FIG. 27*b*, step 218 represents calling a local process 23 called Read File to obtain the file from the upload directory 50*a* and step 220 represents calling a local process 23 called Upload File. Upload file makes a method call to a transfer method 51 operated by the web services server 46. The transfer method 51 is also called Upload File. The local function provides the Session ID 83 and File Name as parameters of the method call. In response, the web services server 46 executes its Upload File Method as discussed with respect to FIG. 19 to obtain the BLOB, store the BLOB in object storage 317 and create an applicable record in the ownership table 62. The class value 90 is derived from the file name included in the Upload File method call.

Decision box 222 represents determining the upload file process determining the upload file type—which is indicated in a BLOB handling parameter 326 provided at step 170. If the upload file type is data processing, step 226 represents the execution of a local process 23 called Process BLOB. The local process makes a method call to a transfer method 51 operated by the web services server 46. The transfer method 51 is also called Process BLOB. The local process provides the Session ID 83, BLOB ID 89, and loading rules 327 (from the event parameters table 312) as parameters of the method call. In response, the web services server 46 executes its Process BLOB Method as discussed with respect to FIG. 21.

If at decision box 222 the upload type is a message, a determination as to whether a new destination group must be written to the ownership table 62 at step 228. If yes, step 230 represents execution of a local process called Set Destination BLOB Owner. The local process makes a method call to a transfer method 51 operated by the web services server 46. The transfer method 51 is also called Set Destination BLOB Owner. The local process provides the Session ID 83, BLOB ID 89, and destination group ID 325 as parameters of the method call. In response, the web services server 46 executes its Set Destination BLOB Owner Method as discussed with respect to FIG. 20.

Step 232, represents executing the Update Event local function as previously discussed to indicate that the event is complete.

Step 234 represents execution of a local function called Rename File for purposes of renaming and moving the file from the upload directory 50*a* to a unique file name (such as the original file name combined with a time stamp at which the rename occurred) within a processed files directory 52*a*.

Audit Log

FIG. 28 represents an exemplary audit log tables 312 which may include a is plurality of audit logs 340*a*-340*c*—one for each transfer client 24. Each audit log 340 comprises a plurality of records 322, each representing a recorded audit event. The fields of the audit log 340 comprise a date field 341, a time field 346, a method called field 348, and a parameters passed field 350.

The date field 341 and the time field 346 establish the date and time at which the record 342 was written to the audit log table 84. The method called field identifies the transfer method 51 that was called and the parameters passed field 350 contains the parameters included in the method call. Each method called is logged in the audit table 312.

Back End Server

In the exemplary embodiment, each back end server application (for example payment server 13) interacts with the web services server in the same manner as the transfer client 24. More specifically, the back end server application may include a transfer client 24 for making method calls to the transfer methods 51 to (as discussed with respect to FIGS. 9 through 21) for obtaining files stored in the object storage 317 by another system and placing objects in the object storage 317 for retrieval by other systems.

Figure 29A:
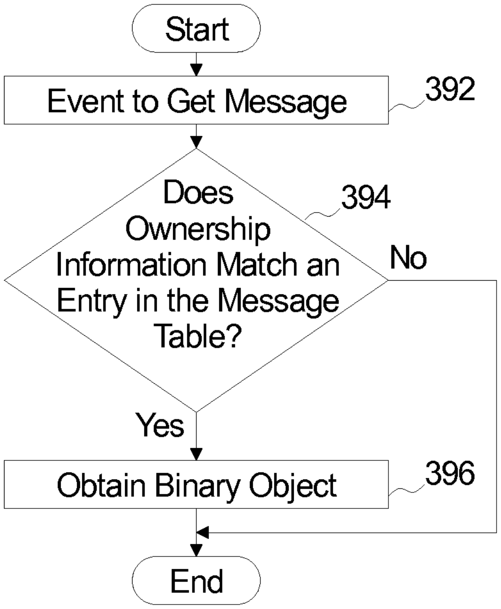
FIGS. 29*a* and 29*b* represent exemplary operation of a back end server application in accordance with one embodiment of the present invention.
Figure 29B:
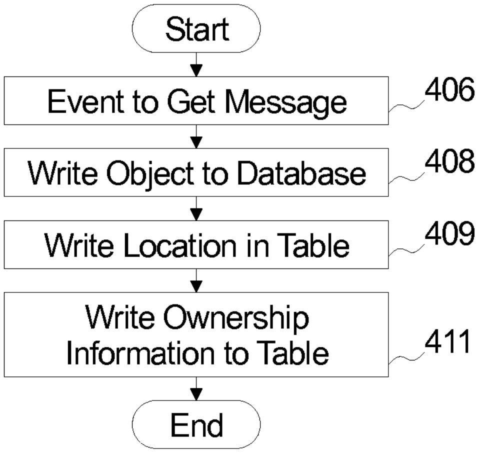

In another embodiment, the back end application server may obtain the object directly from the database 118. FIGS. 29*a* and 29*b* represent operation of the back end server application obtaining object from, and putting objects to, the database 40.

Referring to FIG. 29*a*, step 392 represents the occurrence of an event wherein the back end server application will attempt to obtain a binary object from the object storage 317 of the database 118. Such events may be any events generated internally and applicable to the data processing functions of the back end server application.

Step 394 represents accessing the ownership table 62 to determine whether an object with applicable ownership information exists in the object storage 317. If not, there is no object to retrieve. If an object in the object storage 317 matches the ownership information, the back end application server obtains the location of the object form the ownership table 62 and obtains the object at step 396.

Referring to FIG. 29*b*, step 406 represents the occurrence of an event wherein the back end server application 38 will put a binary object into the object storage 317 of the database 40. Again, such events may be any events generated internally and applicable to the data processing functions of the back end server application.

Step 408 represents writing the object to the object storage 317 in the database 40. Steps 409 and 411 represent adding a record to the message table 62 and writing the location of the object within the object storage 317 and the ownership information to the newly created record.

Payment Application

Referring to FIG. 31 in conjunction with FIG. 1*c*, the database 118 may include, as one of its data structures, sensitivity score table 306. The sensitivity score table 306 may associate each industry code of a group of industry codes 307 to a sensitivity score 308. The group of industry codes 307 may be the four digit Standard Industrial Classification (SIC) code promulgated by the US Government; the six digit North American Industry Classification System (NAICS) code promulgated by the US Government, or the codes of any other industry classification system which utilizes alpha numeric characters or other code values to classify industries and commercial activities.

The sensitivity score 308 assigned to each industry code may be one of a group of discrete score values such as score values 1, 2, 3, 4, and 5 which represents how sensitive typical participants in such industry are to a fee charge related to receipt of payments. This measure or sensitivity may be determined based on evaluations of historical information related to industry participants accepting fees or other empirical evaluations or methods of study.

Turning briefly to FIG. 32*a*, the database 118 may further include, as one of the data structures, a vendor registry 112. The vendor registry 112 may comprise a group of vendor records 128. The group of vendor records 128 may comprise unique records, each of which is associated with, and identifies, a unique one of the vendors of the community of vendors 12 by inclusion of a unique system ID (for example, Vendor A, Vendor B, and Vendor C) within a system ID field 130 of the record.

Also associated with the vendor may be: i) the vendors name included in a name field 132; ii) the vendor's tax identification number included in a tax ID field 134; iii) the vendor's industry code 135; iv) the vendor's contact information included in a contact information field 136; v) the vendors remittance address included in a remittance address field 138; and vi) the vendors remittance account identifier included in a remittance account identifier field 140.

The vendor's name 132 may be the official name of the entity as recorded in official records of the jurisdiction in which it is formed and as used for titling its bank accounts, including its remittance account.

The vendor's industry code 135 may be the code of the group of industry codes 307 which represents the industry or commercial activity in which the vendor participates.

The vendor's remittance address 138 may be an address the vendor typically uses for receiving checks from its customers by regular mail (for example a lock box address).

The vendor's contact information 136 may include the name of an individual in the vendor's accounts receivable department responsible for managing the vendor's accounts receivable matters with the payers 14.

The vendor's remittance account identifier 140 may identify the bank at which the vendor's remittance account is held, such as by an ABA routing number, an account number, and/or other information needed by the payment system 30 and/or settlement network 32 to execute deposits to the vendor in accordance with payment authorization instructions provided by a payer.

Each record 128 of the vendor registry 112 may further associate with a unique group of payer rate records 141*a*, 141*b*. The unique group of rate records 141 associated with a record 128 of the vendor registry identifies, for that vendor identified in the record 128, those payers which make payment to the vendor and the payer specific transaction rate to apply to payments from the payer to the vendor. For example the record 128 associated with Vendor A may associate with payer rate records 141*a* and records 144*a* of the payer rate records 141*a* include: i) a record with Payer A populated to the Payer ID is field 142 and 1.25% populated to the rate field 143 indicating that a transaction fee rate of 1.25% applies to payments made by Payer A to Vendor A; and ii) a record with Payer C populated to the Payer ID field 142 and 1.75% populated to the rate field 143 indicating that a transaction fee rate of 1.75% applies to payments made by Payer C to Vendor A.

Similarly, the record 128 associated with Vendor C may associate with payer rate records 141*b* and records 144*b* of the payer rate records 141*b* include: i) a record with Payer A populated to the Payer ID field 142 and 1.00% populated to the rate field 143 indicating that a transaction fee rate of 1.00% applies to payments made by Payer A to Vendor C; ii) a record with Payer B populated to the Payer ID field 142 and 2.00% populated to the rate field 143 indicating that a transaction fee rate of 2.00% applies to payments made by Payer B to Vendor A; and iii) a record with Payer F populated to the Payer ID field 142 and 0.50% populated to the rate field 143 indicating that a transaction fee rate of 0.50% applies to payments made by Payer F to Vendor C. It should be appreciated that the rate on payments from Payer A to Vendor A is different than the rate on payments form Payer A to Vendor C.

Turning to FIG. 32*b* the database 118 may include a payer registry 114 which may comprise a group of payer records 120. Each record 120 is associated with, and identifies a unique one of the payers 14*a*-14*f* of the community of payers 14 by inclusion of a unique system ID (for example Payer A, Payer B, Payer C) within a system ID field 122 of the record.

Also associated with the Payer may be: i) the payer's name included in a name field 146; ii) the payer's tax identification number included in a tax ID field 147; iii) the payer's contact information included in a contact information field 148; v) identification of the participating bank with which the payer is associated in a participating bank field 149; and vi) the payer's transaction or funding account identifier included in a funding account information field 124.

The payer's name 146 may be the official name of the entity as recorded in official records of the jurisdiction in which it is formed and as used for titling its bank accounts, including its funding account.

The payer's contact information 148 may include the name of an individual in the payer's accounts payable department responsible for managing the payer's accounts payable matters with the vendors 12.

The participating bank identifier may be a character string identifying the bank—such as the bank's name or ABA routing number.

The payer's funding account identifier 140 may identify the bank at which the payer's funding account is held (which is not necessarily a participating bank) such as by an ABA routing number, an account number, and/or other information needed by the payment system 20 or settlement network 32 to execute transactions to fund the participating banks pooling account 34*a*, 34*b* from the payer's funding account in accordance with payment authorization instructions provided by a payer.

Turning to FIG. 32*c* the database 118 may include a participating bank registry 501 comprising a group of bank records 504. Each record 504 is uniquely associated with, and uniquely identifies, one of the participating banks of the group of participating banks by identification of a unique bank ID (for example Bank A, Bank B, Bank C) in a bank ID field 506 of the record. Each record also includes a bank name field 508 and a pooling account identifier field 509. The bank's name may be the official name of the bank as recorded in official records of the jurisdiction in which it is formed. The pooling account identifier may identify the bank such as by an ABA routing number, an account number, and/or other information needed by the payment system 20 and/or settlement network 32 to execute transactions to fund the pooling account in accordance with payment authorization instructions provided by a payer.

Turning to FIG. 32*d* the database 118 may include a remittance database 330 comprising a group of remittance records 332. Each record 332 is uniquely associated with, and uniquely identifies, a single payment from a payer to a payee. The record 332 includes the unique system ID identifying the payment in a payment ID field 334, identification of the payer making the payment by inclusion of the payer's unique system ID in a payer ID field 336, identification of the vendor receiving the payment by inclusion of the unique system ID of the vendor in a vendor ID field 338, the amount of the payment in a payment amount field 339, and remittance information in a remittance string field 340.

The remittance information may identify the vendor's invoice being paid, goods or services for which payment is being made, or other aspects of an underlying transaction between the payer and vendor giving rise to the payment associated with the record.

Figure 33A:
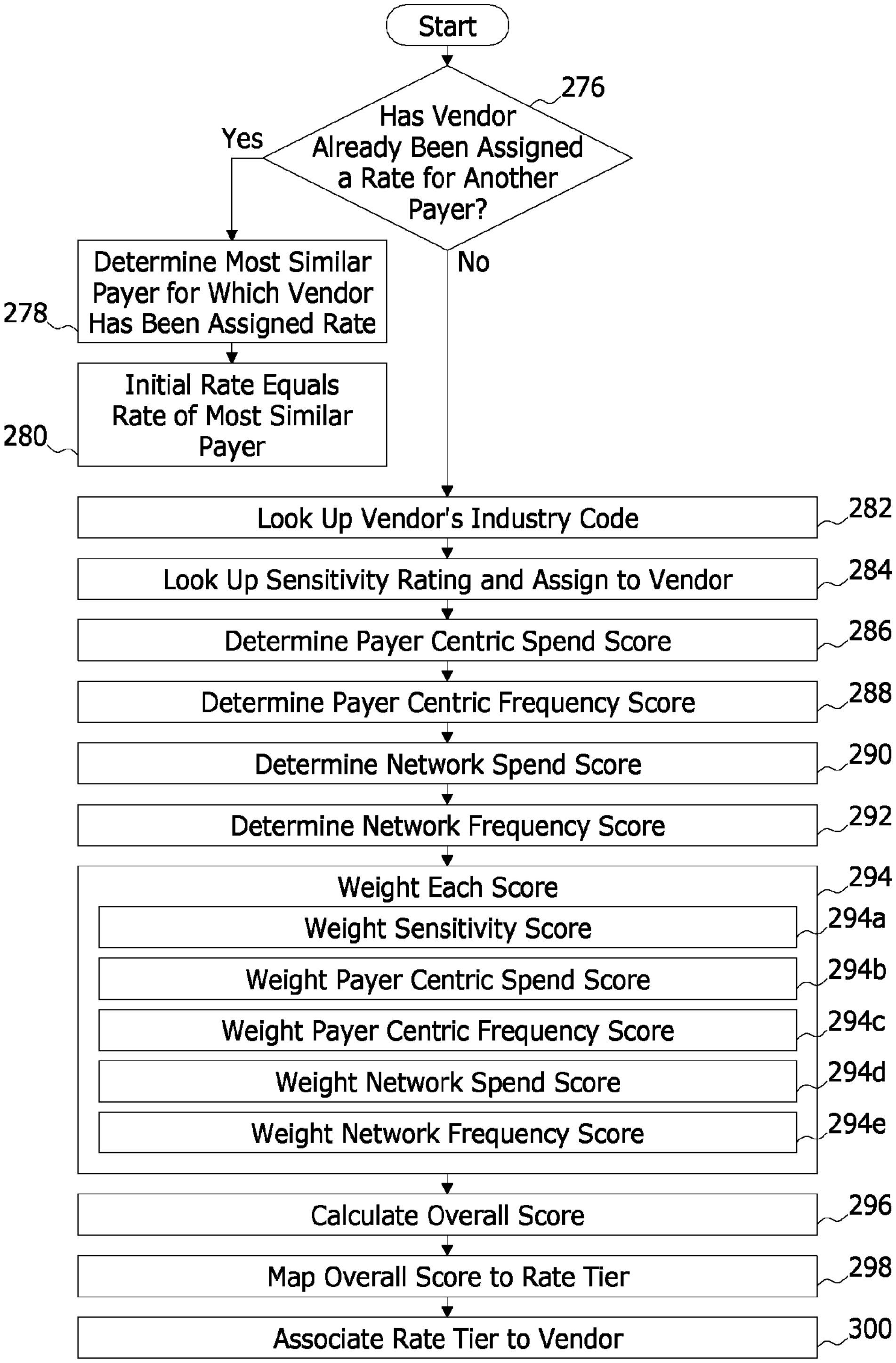
FIG. 33*a* is a flow chart representing a first aspect of operation of a fee tier assignment application in accordance with the present invention.

Turning to FIG. 33*a*, exemplary steps performed by a rate tier assignment application 204 of the payment server 13 (FIG. 1*a*) to assign, for a prospective payer, an initial payer specific rate to a vendor are shown. Step 276 represents determining whether the vendor has already been assigned a rate by another payer. If the vendor has already been assigned a rate by one or more other payers (i.e. payer rates are populated into the payer rate records 141 associated with the vendor in the vendor registry 112), the rate tier assignment application 204 determines which of the one or more other payers has the most similar payer/vendor relationship with the vendor as the prospective payer at 278.

More specifically, if the vendor has an assigned rate for only one other payer, that one payer would be the payer with the most similar payer/vendor relationship. If the vendor has an assigned rate with more than one payer, the other payer which pays the vendor the most similar annual payment volume and the most similar payment frequency would be the payer with the most similar payer/vendor relationship.

At step 280, the rate assigned to the vendor, for payments by the prospective payer, would be the same rate that is in effect with the most similar other payer.

Alternatively, if at step 278 it is determined that the vendor has not already been assigned a rate for payments by any other payers (i.e. no payer/rate combinations are populated to the payer rate records 141 in association with the vendor in the vendor registry 112 of FIG. 32*a*), the rate assignment application 204 executes steps 282 through 300 to assign an initial rate.

Step 282 represents determining the vendor's industry code. The rate tier assignment application 204 may determine the vendor's industry code by retrieving it from the industry code field 135 of the record associated with the vendor in the vendor registry 112 (FIG. 32*a*). Alternatively, with reference to FIG. 30 in conjunction with FIG. 32*a*, if the vendor's industry code is not available in the vendor registry 112, the rate tier assignment application 204 may query a SIC code database 302.

The SIC code database 302 may associate the name of each company within a group of companies 304 with the company's industry code. Each company may be identified by its name, tax ID number, or other identifier. In querying the SIC code database 302, the rate tier assignment application may provide the vendor's name, tax ID number, or other identifier and receive, in response, the vendors industry code.

The SIC database 302 may be a remote database accessible over the internet 20, a local database coupled to the system 10, or a local database that is part of database 118 of system 10.

Returning to FIG. 33*a*, step 284 represents determining the vendor's industry sensitivity score by looking up the industry sensitivity score 308 associated with the vendor's industry code in the sensitivity score table 306 (FIG. 31).

Step 286 represents determining the vendor's payer centric spend score. The vendor's payer centric spend score is a function of the aggregate value of all payments expected to be made by a particular payer, for example payer 14*a*, to the vendor over a predetermined period of time, such as one calendar year and may be an integer value of one (1) through five (5).

The aggregate amount of payments expected to be made by the particular payer to the vendor over the one year period may be determined based on historical payment information, such as the aggregate amount of payments made by the particular payer to the vendor over the previous year.

Referring briefly to FIG. 35*a*, in an exemplary embodiment, the rate tier assignment application 204 may maintain a payer centric spend table 241 (which may be embodied in computer readable medium) which includes a record 243 associated with each score value 1-5. The record designates criteria for assigning the score value. In the exemplary embodiment: i) a score value of 1 is assigned if the aggregate amount of payments expected to be made by the particular payer to the vendor over a one year period is less than or equal to $5,000; ii) a score value of 2 is assigned if the aggregate amount of payments expected to be made by the particular payer to the vendor over a one is year period is between $5,001 and $10,000; iii) a score value of 3 is assigned if the aggregate amount of payments expected to be made by the particular payer to the vendor over a one year period is between $10,001 and $15,000; iv) a score value of 4 is assigned if the aggregate amount of payments expected to be made by the particular payer to the vendor over a one year period is between $15,001 and $50,000; and v) a score value of 5 is assigned if the aggregate amount of payments expected to be made by the particular payer to the vendor over a one year period is greater than $50,000.

Step 288 represents determining the vendor's payer centric frequency score. The vendor's payer centric frequency score is a function of the quantity of payments expected to be made by a particular payer, for example payer 14*a*, to the vendor over a predetermined period of time, such as one calendar year and may be may be an integer value of one (1) through five (5).

The total quantity of payments expected to be made by the particular payer to the vendor over the one year period may be determined based on historical payment information, such as the total quantity of payments made by the particular payer to the vendor over the previous year.

Referring briefly to FIG. 35*b*, in an exemplary embodiment, the rate tier assignment application 204 may maintain a payer centric frequency table 245 (embodied in computer readable medium) which includes a record 247 associated with each score value 1-5. The record designates criteria for assigning the score value. In the exemplary embodiment: i) a score value of 1 is assigned if the total quantity of payments expected to be made by the particular payer to the vendor over a one year period is no greater than one (1); ii) a score value of 2 is assigned if the total quantity of payments expected to be made by the particular payer to the vendor over a one year period is two (2) to three (3); iii) a score value of 3 is assigned if the total quantity of payments expected to be made by the particular payer to the vendor over a one year period is between four (4) and ten (10); iv) a score value of 4 is assigned if the total quantity of payments expected to be made by the particular payer to the vendor over a one year period is between eleven (11) and fifteen (15); and v) a score value of 5 is assigned if the total quantity of payments expected to be is made by the particular payer to the vendor over a one year period is greater than fifteen (15).

Step 290 represents determining the vendor's network spend score. The vendor's network spend score is a function of the aggregate value of all payments expected to be made by all payers within the group of payers 14 to the vendor over a predetermined period of time, such as one calendar year and may be may be an integer value of one (1) through five (5).

The aggregate amount of payments expected to be made to the vendor by multiple payers within the network of payers over the one year period may be determined based on historical payment information, such as the aggregate amount of payments made to the vendor by multiple payers within the network of payers over the previous year.

Referring briefly to FIG. 35*c* in conjunction with FIG. 1, in an exemplary embodiment, the rate tier assignment application 204 may maintain a network spend table 249 (embodied in computer readable medium) which includes a record 251 associated with each score value 1-5. The record designates criteria for assigning the score value. In the exemplary embodiment: i) a score value of 1 is assigned if the aggregate amount of payments expected to be made to the vendor by multiple payers within the network of payers over a one year period; divided by the number of payers making payment to the vendor to derive a "per payer average" results in a per payer average less than or equal to $5,000; ii) a score value of 2 is assigned if the aggregate amount of payments expected to be made to the vendor by multiple payers within the network of payers over a one year period results in a per payer average between $5,001 and $10,000; iii) a score value of 3 is assigned if the aggregate amount of payments expected to be made to the vendor by multiple payers within the network of payers over a one year period results in a per payer average between $10,001 and $15,000; iv) a score value of 4 is assigned if the aggregate amount of payments expected to be made to the vendor by multiple payers within the network of payers over a one year period results in a per payer average between $15,001 and $50,000; and v) is assigned if the aggregate amount of payments expected to be made to the vendor by multiple payers within the network of payers over a one year period results in a per payer average greater than $50,000.

Step 292 represents determining the vendor's network centric frequency score. The vendor's network frequency score is a function of the totally quantity of payments expected to be made by all payers within the group of payers 14 to the vendor over a predetermined period of time, such as one calendar year and may be may be an integer value of one (1) through five (5).

The total quantity of payments expected to be made to the vendor by multiple payers within the network of payers over the one year period may be determined based on historical payment information, such as the total quantity of payments made to the vendor by multiple payers within the network of payers over the previous year.

Referring briefly to FIG. 35*d*, in an exemplary embodiment, the rate tier assignment application 204 may maintain a network frequency table 252 (embodied in computer readable medium) which includes a record 254 associated with each score value 1-5. The record designates criteria for assigning the score value. In the exemplary embodiment: i) a score value of 1 is assigned if the total quantity of payments expected to be made to the vendor by multiple payers within the network of payers; divided by the number of payers making payment to the vendor to result in a "per payer average" results in a per payer average of one (1); ii) a score value of 2 is assigned if the total quantity of payments expected to be made to the vendor by multiple payers within the network of payers results in a per payer average of two (2) to three (3); iii) a score value of 3 is assigned if the total quantity of payments expected to be made to the vendor by multiple payers within the network of payers results in a per payer average of four (4) and ten (10); iv) a score value of 4 is assigned if the total quantity of payments expected to be made to the vendor by multiple payers within the network of payers results in a per payer average of eleven (11) and fifteen (15); and v) a score value of 5 is assigned if the total quantity of payments expected to be made to the vendor by multiple payers within the network of payers results in a per payer average of sixteen (16) or greater. In all cases fractional values may be rounded to the nearest integer value, rounded up to the nearest integer value, or rounded down (i.e. truncated) to the nearest integer value.

Step 294 represents weighting each score. Referring to the weighting table of FIG. 35*e*, each score, as determined at steps 282 through 292 is multiplied by a weight factor 255 to determine a weighted score.

More particularly, at step 294*a*, the sensitivity score is weighted (or multiplied by) a factor of 1.0 to determine a weighted industry sensitivity score.

At step 294*b* the payer centric spend score is weighted by a factor of 0.65 to determine a weighted payer centric spend score. Provided however, in the event the payer centric spend score is greater than four (4) and the payer centric frequency score is less than two (2), the payer centric spend score is weighted by a factor of 0.2 to determine the weighted payer centric spend score.

At step 294*c* the payer centric frequency score is weighted by a factor of 0.85 to determine a weighted payer centric frequency score.

At step 294*d* the network spend score is weighted by a factor of 0.75 to determine a weighted network spend score. Provided however, in the event the network spend score is greater than four (4) and the network frequency score is less than two (2), the network spend score is weighted by a factor of 0.2 to determine the weighted network spend score.

At step 294*e* the network frequency score is weighted by a factor of 0.95 to determine a weighted network frequency score.

Step 296 represents calculating an overall score. The overall score is the average of the weighted industry sensitivity score, the weighted payer centric spend score, the weighted payer centric frequency score, the weighted network spend score, and the weighted network frequency score. It should be appreciated that each weight factor associated with each score may be distinct from other weight factors associated with other scores.

Step 298 represents determining the rate to initially assign to the vendor by mapping the overall score to a rate tier. Referring to FIG. 35*f*, examples of how the mapping may be performed include: i) rounding the overall score to the closest rate tier score value 258, for example overall score of 2.51 maps to rate Tier_3; and ii) truncating the overall score to the closest rate tier value, for example overall score of 2.51 maps to rate Tier_2.

Step 300 represents associating the rate applicable to payments made by the payer to the vendor by: i) writing a new record 144 to the payer rate records 141 associated with the vendor, such new record including the system ID of the payer in the payer ID field 142 and the rate 261 in the rate field 143.

It should be appreciated that the steps represented by FIG. 33*a* represent the exemplary embodiment wherein the overall score and the rate assigned for payments by the payer to the vendor are a function of all of the vendor's industry score, payer centric spend score, payer centric frequency score, network spend score, and network frequency score. The scope of the present invention includes determining the overall score and rate assignment as a function of permutations of one or more of any of these scores.

For example, determining the rate based on: i) industry score only (permutation of only one score), ii) industry score, payer centric spend score, and payer centric frequency score (permutation of three scores); and iii) industry score, network spend score, and network frequency score (a different permutation of three scores). When permutations of fewer than all scores are used, the weighted average is based on only those scores that are used.

Figure 33B:
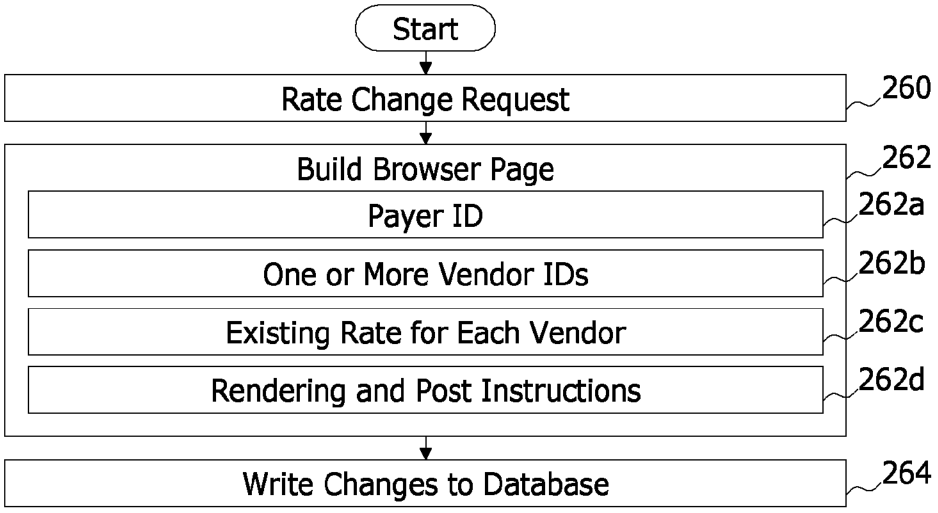
FIG. 33*b* is a flow chart representing a second aspect of operation of a fee tier assignment application in accordance with the present invention.

Turning to FIG. 33*b*, the rate tier assignment application 204 further includes steps which, when executed by the processor permit a rate assigned to a vendor (for a prospective payer) to be altered by, or at the direction of, the prospective payer.

Step 260 represents a rate change request being provided to the rate tier assignment application 204. In response, the rate tier assignment application 204 builds a render-able object which permits the rate to be altered.

Figure 34:
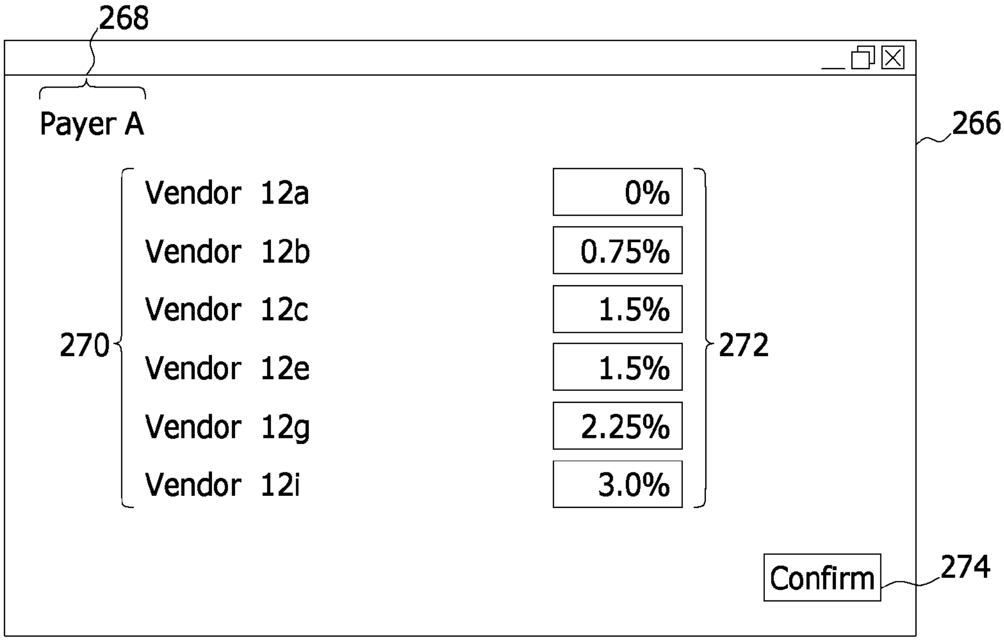
FIG. 34 is a graphic depicting an exemplary user interface for fee tier assignment in accordance with and aspect of the present invention.

FIG. 34 depicts an exemplary render-able object 266, in graphic form. Referring to FIG. 33*b* and FIG. 34, step 262 represents populating the payer ID 268 of the prospective payer to the render-able object 266. Step 262*b* represents populating one or more vendor IDs 270 to the render-able 266, each vendor ID being for a vendor within the prospective payer's payer vendor group. Step 262*c* represents populating the existing rate applicable to payments made by the payer to each such vendor as such rates are recorded in the payer rate records 141 associated with the vendor (FIG. 5*a*).

Step 262*d* represents populating rendering instructions which may be code necessary for a payer system 49*a*, 49*b*, 49*c* (FIG. 1*b*) to render the render-able object 266 in graphic format and post user entered changes to the existing rate 272 back from the system 49*a*, 49*b*, 49*c* to the rate assignment application 204 in response to user action such as clicking a confirm button 274. Upon receipt of such a post, the rate assignment application 204 writes, at step 264, the updated rates to the applicable fields of payer rate records 141 (FIG. 32*a*).

Returning to FIG. 1*a*, in operation, the payment system 10 processes payments, each payment being initiated by one of the payer's within the community of payers 14, for payment of a payment amount from the payer's account to one of the vendors within the community of vendors 12. More specifically the payment system 10 receives a payment instruction file identifying payments to process for the payer. The payment instruction file may be sent from a payer and include records which represent payments from that payer only to a group of vendors. Alternatively, the payment instruction file may be sent by a participating bank (also referred to as an originating bank) and include records which represent payments from multiple payers associated with the participating bank.

Referring to FIG. 36*a* a first exemplary payment instruction data structure 534*a*, or payment instruction file, that would be received from a payer 14 may comprises identification of the payer within a payer ID field 536 (Payer ID "Payer A" representing payer 14*a*) and, associated with that payer ID field 536, a group of unique records 546, each record representing a unique payment instruction. Each record 547 includes: i) identification of the vendor to which payment is to be made by inclusion of the vendor's Vendor ID (from the vendor registry 112) within a vendor ID field 538; ii) identification of the amount of the payment to be made to the vendor by inclusion of a payment amount within a payment amount field 540; and iii) remittance information, which may be alpha numeric information identifying what payable is being paid, within a remittance string field 542. The remittance information may identify the vendor's invoice being paid, goods or services for which payment is being made, or other aspects of an underlying transaction between the payer and vendor giving rise to the payment associated with the record.

FIG. 36*b* represents a second exemplary payment instruction data structure 534*b*, or payment instruction file that would be received from a payer 14 comprising a group of unique records 546, each record representing a unique payment instruction. Each record 546 includes: i) identification of the payer within a payer ID field 536 (i.e. Payer ID "Payer B" representing payer 14*b*)); ii) identification of the vendor to which payment is to be made by inclusion of the vendor's Vendor ID (from the vendor registry 112) within a vendor ID field 538; iii) identification of the amount of the payment to be made to the vendor by inclusion of a payment amount within a payment amount field 540; and iv) remittance information, which may be alpha numeric information identifying what payable is being paid, within a remittance string field 542. Again, the remittance information may identify the vendor's invoice being paid, goods or services for which payment is being made, or other aspects of an underlying transaction between the payer and vendor giving rise to the payment associated with the record.

FIG. 36*c* represents a third exemplary payment instruction data structure 534*c*, or payment instruction file that would be received from a payer 14 comprising a group of independent unique payment instructions 544*a*, 544*b* and 544*c*, may in the aggregate be a payment instruction file 534*c*.

Each payment instruction may include: i) identification of the payer within a payer ID field 536; ii) identification of the vendor to which payment is to be made by inclusion of the vendor's Vendor ID (from the vendor registry 112) within a vendor ID field 538; iii) identification of the amount of the payment to be made to the vendor by inclusion of a payment amount within a payment amount field 540; and iv) remittance information, which may be alpha numeric information identifying what payable is being paid, within a remittance string field 544. Again, the remittance information may identify the vendor's invoice being paid, goods or services for which payment is being made, or other aspects of an underlying transaction between the payer and vendor giving rise to the payment associated with the record.

FIG. 36*d* represents a fourth exemplary payment instruction data structure 534*d*, is or payment instruction file—of a type which may be received from a participating bank 28*a*, 28*b*. The payment instruction file 534*d* may comprise identification of the participating bank 548 (such as by name or ABA routing number) and a group of unique records 550. Each record 550 represents a unique payment instruction and includes: i) identification the system ID of a disbursing payer associated with the participating bank within a payer ID field 536 (i.e. Payer ID "Payer B" representing payer 14*b*)); ii) a system ID of the vendor to which payment is to be made by inclusion of the vendor's system ID within a vendor ID field 538; iii) identification of the amount of the payment to be made to the vendor by inclusion of a payment amount within a payment amount field 540; and iv) remittance information 542.

Again, the remittance information may be alpha numeric information identifying the purpose of the payment or identifying what payable is being paid; such as by identifying the vendor's invoice being paid, goods or services for which payment is being made, or other aspects of an underlying transaction between the payer and vendor giving rise to the payment associated with the record. It should be appreciated that records 550 may represent payments from different disbursing payers in the same payment instruction file 534*d.*

Figure 37A:
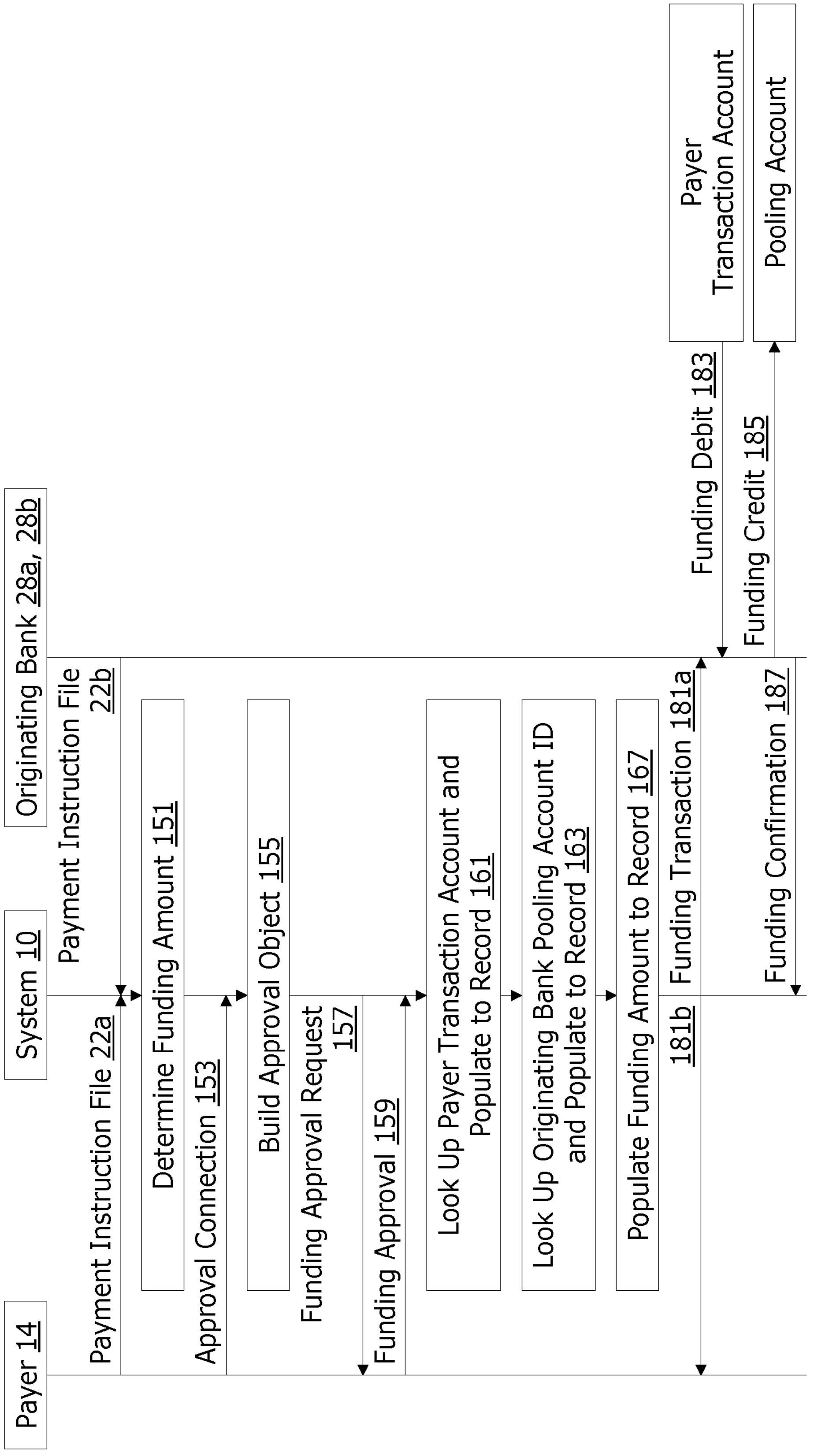
FIG. 37*a* is a ladder diagram representing a combination of data structures and instructions stored in memory and executed by a processor for making payments from each payer of a community of payers to each vendor of a community of vendors, all in accordance with an aspect of the present invention.

Referring to the ladder diagram of FIG. 37*a* in conjunction with FIG. 1, in an exemplary embodiment of operation, the payment system 10 receives a payment instruction file from either a payer 14*a*-14*f* or a participating bank 36, 38. For example, payment instruction file 534*a* (FIG. 36*a*) may be received from payer 14*a*, as represented by step 22*a* or payment instruction file 534*d* (FIG. 36*d*) may be received from participating bank 28*a* as represented by step 22*b*. In either case the payment instruction file 534*a*, 534*d* may be transferred via a secure connection over the network 20 which may include implementing encryption of the connection and/or the file transferred over the connection.

In an exemplary embodiment, the file transfer systems operated by the combination of the payer's unattended interface module 24 and the web services server, as described herein, may be used to upload the payment instruction file and write records to the is database accessible to the payment application server 13 (i.e. process BLOB, FIG. 21), or transfer to the payment application server 13 (set destination BLOB owner, FIG. 20). For purposes of the payment application server 13 obtaining the payment instruction file from the object storage 317, the payment application server 13 may also include an unattended interface module 24 which utilizes the check for available BLOB and Download BLOB methods calls to retain the payment instruction file.

Upon receiving and authenticating the payment instruction file 534, the payment system 10, or more specifically, the processor 40 executing a payment application 18 of the payment server 13, determines, for the disbursing payer, or each disbursing payer, represented by records of the file 534, a funding amount at step 151. The funding amount for a disbursing payer is equal to the aggregate or sum of the amount of all payments to be disbursed by the disbursing payer as represented in the payment instruction file 534.

Figure 38:
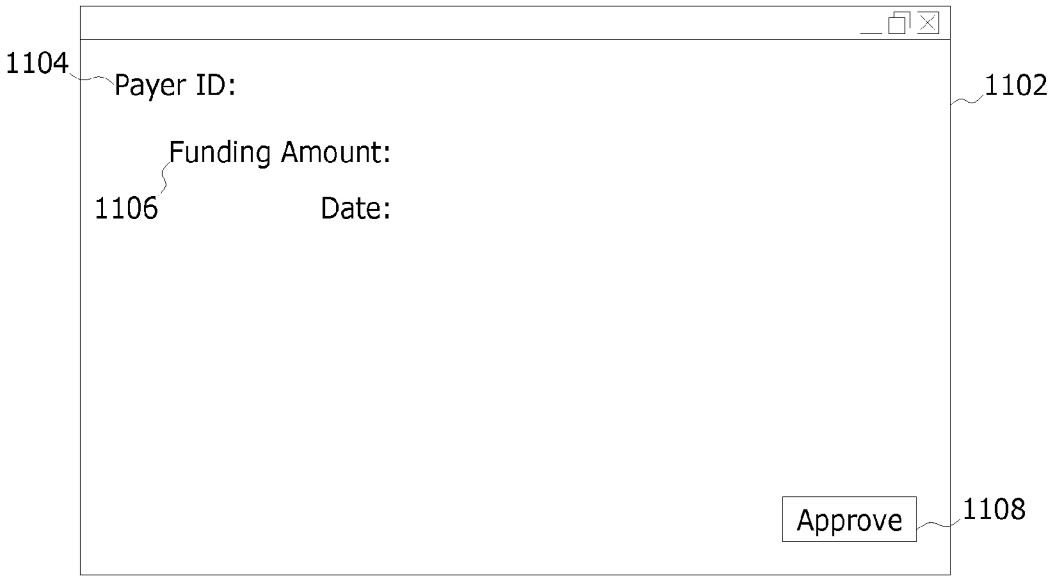
FIG. 38 is a graphic depicting an exemplary user interface for funding amount approval in accordance with and aspect of the present invention.

Steps 153 through 159 represent, for each disbursing payer, obtaining the disbursing payer's approval of the funding amount. More specifically, in response to each disbursing payer establishing a secure session by a payer system 49*a*, 49*b*, 49*c* for purposes of approving the funding total (as represented by step 153), the system 10, at step 155, generates a funding approval object (for example object 1102 as represented by FIG. 38) by looking up the funding total calculated for the disbursing payer. Step 157 represents providing the funding approval object to the payer system 49*a*, 49*b*, 49*c* for rendering, authentication, and approval by the payer. Step 159 represents posting of the payer's approval to the system 10.

Referring briefly to FIG. 38, the exemplary funding approval object, represented in graphic form as may be rendered on the remote payer system 49*a*, 49*b*, or 49*c*, may comprise a least identification of the payer 1104, identification of the funding amount 1106, and a control 1108 operational for posting the payer's approval to the system 10.

Returning to FIG. 37*a*, steps 161 through 167 represent generating a funding transaction to fund the transfer the funding total from the payer's account to the pooling account of the participating bank with which the payer is associated. More specifically, generating the funding transaction comprises: i) at step 161, looking up the disbursing is payer's funding account identifier in the payer registry 112 (FIG. 32*b*) and populating the funding account identifier to a field of the funding transaction which identifies the account to be debited; ii) at step 163, looking up the participating bank's pooling account identifier from the participating bank registry 501 and populating the pooling account identifier to a field of the funding transaction which identifies the account to be credited; and iii) at step 167, populating the approved funding amount to a field of the funding transaction which represents the amount to transfer (debit and credit).

Step 181*a* represents sending the funding transaction to the participating bank 28*a*, 28*b* for execution. Execution is represented by debiting the approved funding amount from the disbursing payer's transaction account at step 183 and crediting the participating bank's pooling account at step 185. Step 187 represents the participating bank confirming to the system 10 that the funding transaction is complete and that the approved amount has been deposited into the pooling account.

The debit of the payer's account and credit to the pooling account may be by funds transfer if both accounts are held at the same bank, by transfer through a settlement network 32 (for example via ACH or Wire) if the payers account and pooling account are held at different banks. As discussed, the settlement network 32 may be separate from the payment system 10, such as the Fedwire settlement network or the ACH settlement network, or may be a proprietary component of the payment system 10, such as a bank card association settlement network. In an embodiment wherein the settlement network 32 is part of the payment system 10, the settlement network 32 may be an application comprising instructions stored on the computer readable medium 42 and executed by processor 40, such instructions implementing the credit and debit transactions as described in this specification.

In a second funding embodiment, the funding instruction 181*b* may be a message to the payer from which the payment instruction file was received. The payer may then, accessing a payment system 30 at the payer's bank or a settlement network, initiate a debit transaction to debit the funding amount from payers account and initiation of a credit transaction to credit to pooling account of the funding amount. Again thereafter, step 187 represents the participating bank confirming to the system 10 that the funding transaction is complete and that the approved amount has been deposited into the pooling account.

Figure 37B:
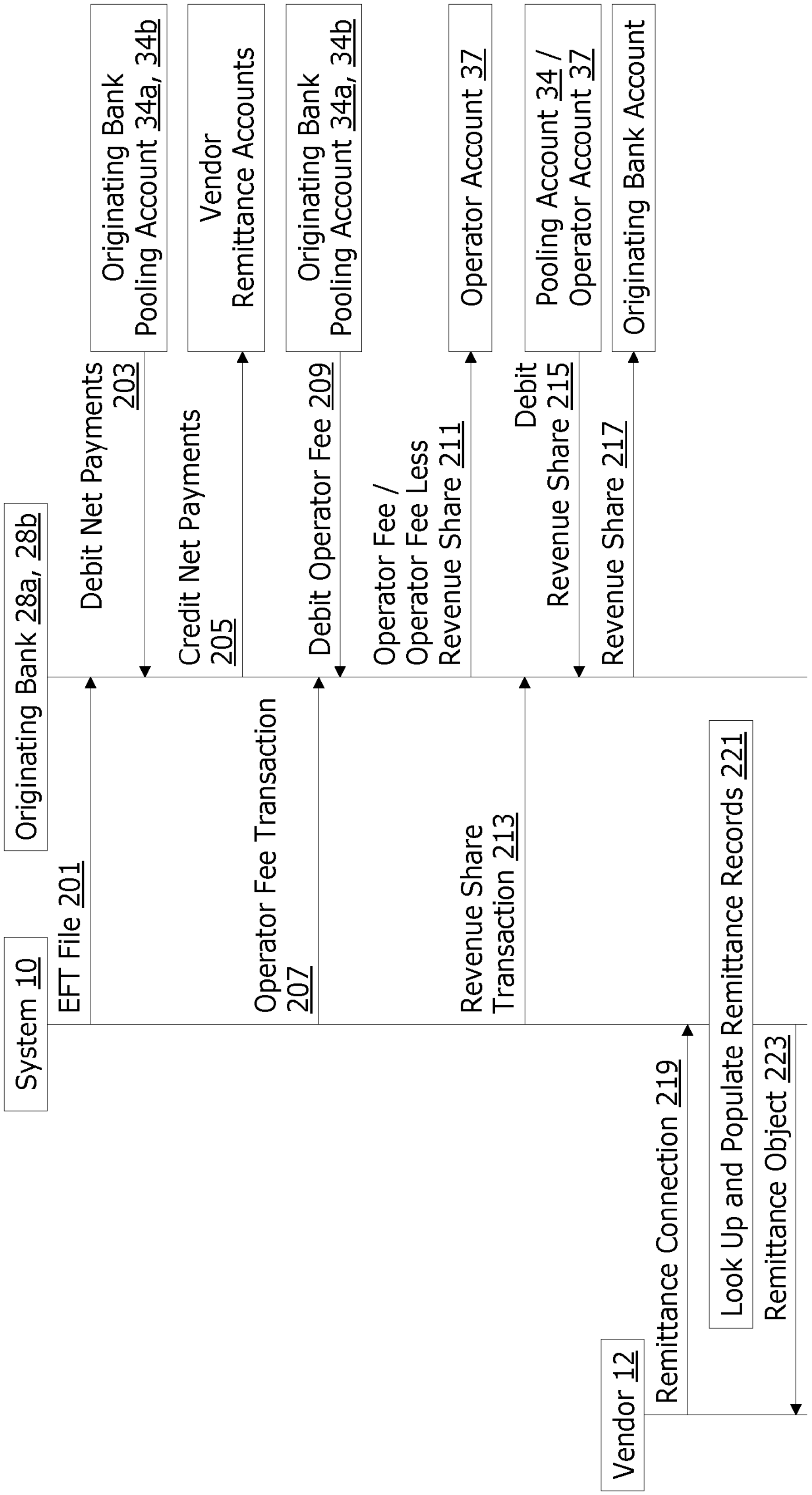
FIG. 37*b* is a ladder diagram representing a combination of data structures and instructions stored in memory and executed by a processor for making payments from each payer of a community of payers to each vendor of a community of vendors, all in accordance with an aspect of the present invention.

After confirmation that the funding amount from one or more payers has been received in the participating bank's pooling account, payments are disbursed to vendors. More specifically, the steps of FIG. 37*b* represent operation of the application 18 to generate an electronic funds transfer (EFT) file 1302 depicted in table format in FIG. 40.

The EFT file 1302 comprises a group of records 1306. Each record represents a single payment of a disbursing payer to a payee. The records of EFT file may represents payments from multiple disbursing payers, but with all of the disbursing payers being within the same sub-group which is associated with a single participating bank 28*a*, 28*b*. The EFT file 1302 includes an identifier of that single participating bank 1304.

Each payment record 1306 includes at least: i) a payment ID field 1308 which populated with a unique value to identify the payment; ii) a field identifying the account to be debited 1310 populated with the participating bank's pooling account identifier (i.e. ABA routing number and account number of the pooling account); iii) a field identifying the account to be credited 1312 populated with the vendor's remittance account identifier (i.e. ABA routing number and account number of the vendor's remittance account); and iv) a payment amount field 1314 populated with the amount of the payment to be debited from the participating bank's pooling account and credited to the vendor's remittance account.

Figures 40, 41:
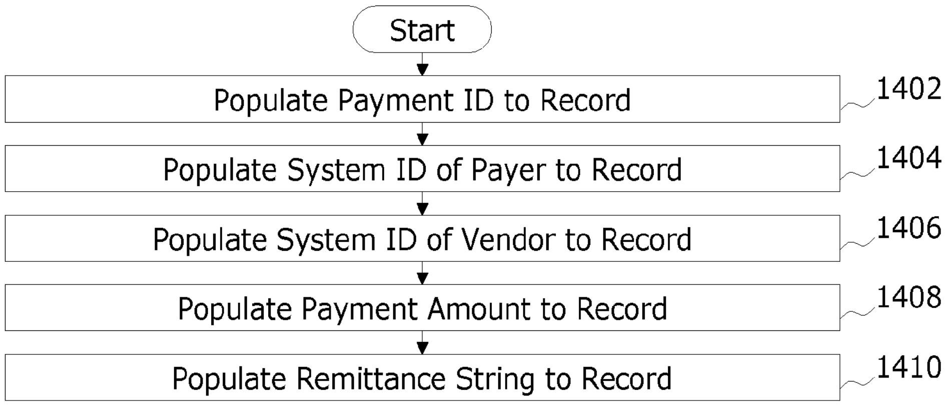
FIG. 40 is a table diagram representing data elements stored in, and relationships between data elements stored in, an electronic funds transfer file in accordance with an aspect of the present invention.
FIG. 41 is a flow chart representing instructions stored in memory and executed by a processor for populating records of an electronic funds transfer file in accordance with an exemplary aspect of the present invention.
Figure 42:
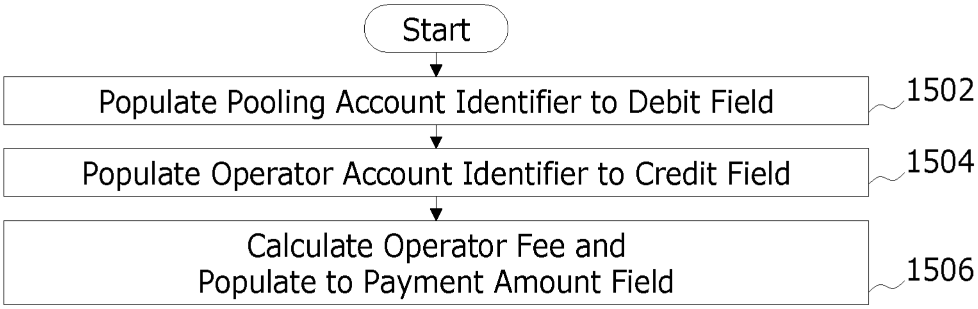
FIG. 42 is a flow chart representing instructions stored in memory and executed by a processor for populating records of an operator fee transaction in accordance with an exemplary aspect of the present invention.

Turning to FIG. 40 in conjunction with FIG. 41, generating each EFT file 1302 for each participating bank comprises, for each payment within the funding amount approved by each disbursing payer with funds on deposit in the pooling account: i) at step 1202, assigning a unique identifying value to the payment and populating it to the payment ID field 1308 of a unique record 1306; ii) at step 1204, looking up the pooling account identifier for the participating bank (in the participating bank registry 501, FIG. 32*c*) and populating the pooling account identifier to the field identifying the account to be debited 1310; iii) at step 1206, looking up the vendor's remittance account identifier and populating the vendor's remittance account identifier to the field identifying the account to be credited 1312; and iv) at step 1208, calculating a net payment amount and populating the net payment amount to the payment amount field 1314.

Calculating the net payment amount may comprise: i) at step 1208*a*, looking up, in the payer rate records 141 of the record 128 of the vendor registry 112 associated with the vendor (i.e. the record 128 with the System ID of the vendor populated to the system ID field 130) the transaction fee rate from the rate field 143 of the record 144 associated with the payer (i.e. the record 144 with the System ID of the disbursing payer populated to the payer ID field 142); ii) at step 1208*b*, calculating the transaction fee by multiplying the gross payment amount by the transaction fee rate; and iii) at step 1208*c*, deducing the transaction fee from the gross payment amount to yield the net payment amount.

Referring to FIG. 37*b*, after the EFT file 1302 is generated, the application 18 transfers the EFT file 1302 to the participating bank with the pooling account from which each payment in the EFT file 1302 is to be debited at step 201.

Again, the transfer techniques described in this application may be used to transfer the EFT file to the participating bank. In a first embodiment, the participating bank may utilize an unattended interface module 24 to obtain the EFT file utilizing check for available BLOB and download BLOB method calls. In a second embodiment, the participating bank may utilize a web services server as described herein and an automated transfer client (not shown) which communicates with the participating bank's web services server may upload the EFT file to the participating bank's systems.

Steps 203 and 205 represent, for each payment represented in the EFT file 1302, debiting the net payment amount from the participating bank's pooling account and crediting the net payment amount to the vendor's remittance account. These steps may be accomplished by way of transferring the EFT file 1302 as disbursement instructions to the Federal Reserve such that each such payment is implemented by an electronic funds transfer commonly known as an ACH payment.

The debit(s) of the pooling account and credits to the vendor's transaction account and operator account by funds transfer if between accounts held at the same bank or by transfer through a settlement network 32 if between accounts are held at different banks.

In an alternative embodiment, the disbursements instructions 203 and 205 may each be an instruction, or a debit/credit instruction pair, sent directly by the payment application 18 the settlement network 32 (whether separate from, or part of the payment system 10) to effect the initiation of a debit transaction to debit the applicable amount from the pooling account and credit the amount of the payment less the transaction fee to the vendor account and to credit the transaction fee to the operator account.

Figure 39:
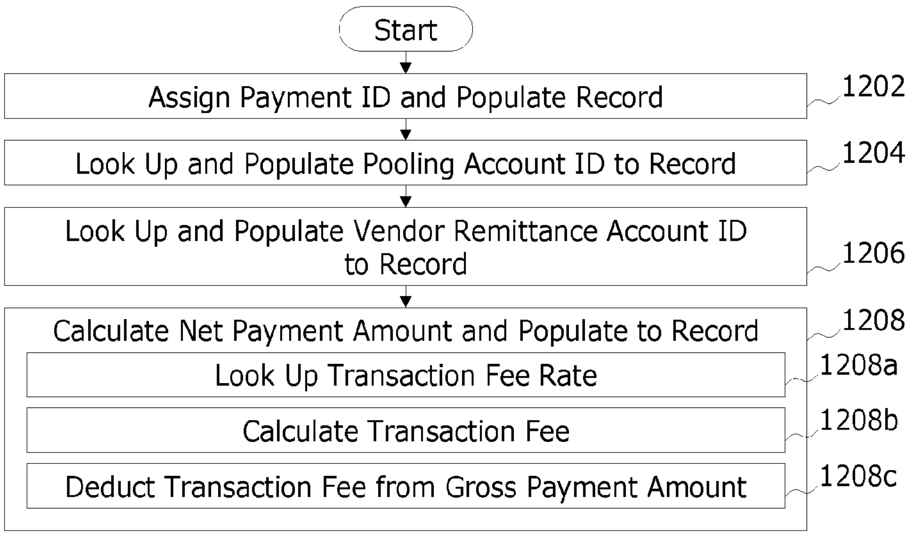
FIG. 39 is a flow chart representing instructions stored in memory and executed by a processor for calculating a variable transaction fee in accordance with an exemplary aspect of the present invention.

As discussed, the payment system will complete the disbursement for each payment within the payment instruction file 534*a*, which for the second payment represented in the payment instruction file 534*a* (i.e. a payment of $200 to vendor 12*e*) includes identifying a payment transaction fee to apply to the second payment, using the process described with respect to FIG. 39, and generating the disbursement instructions to effect the credits and debits as discussed with respect to steps 203 through 205.

Referring FIG. 41 in conjunction with FIG. 37*b* and FIG. 32*d*, the application 18 may executes steps 1402 through 1410 to populate a record for each payment represented in the EFT file 3102 to the remittance database 330.

More specifically, for each payment represented in the EFT file 1302: i) at step 1402, the payment identifier for the payment is populated to the payment ID field 334; ii) at step 1404, the system ID of the disbursing payer is populated to the payer ID field 336; iii) at step 1406, the system ID of the vendor is populated to the vendor ID field 338; iv) at step 1408, the gross payment amount, net payment amount, or both is/are populated to the payment amount field 339; and v) at step 1410, the remittance string from the payment instruction file, or a remittance string based on the remittance string form the payment instruction file, to the remittance string field 340.

Returning to FIG. 37*b*, step 207 represents providing an operator fee transaction to the originating bank for processing. The operator fee transaction may be a record in the EFT file 1302 or a separate transaction. Referring to FIG. 15, generating the operator fee transaction comprises: i) at step 1502, populating the pooling account identifier to a field of the operator fee transaction which identifies an account from which an operator fee is to be debited; ii) at step 1504, populating an operator account identifier to a field of the operator fee transaction which identifies an account held by the operator of the system and to which the operator fee is to be credited; and iii) at step 1506, populating the amount of the operator fee to a payment amount field of the operator fee transaction, the amount of the operator fee being a portion of the aggregate transaction fees for each payment represented in the EFT file 1302. The portion of the aggregate transaction fees may be 100%.

Step 209 represents executing the operator fee transaction by debiting the operator fee from the pooling account and step 211 represents crediting the operator fee to the operator account 37.

Figure 43:
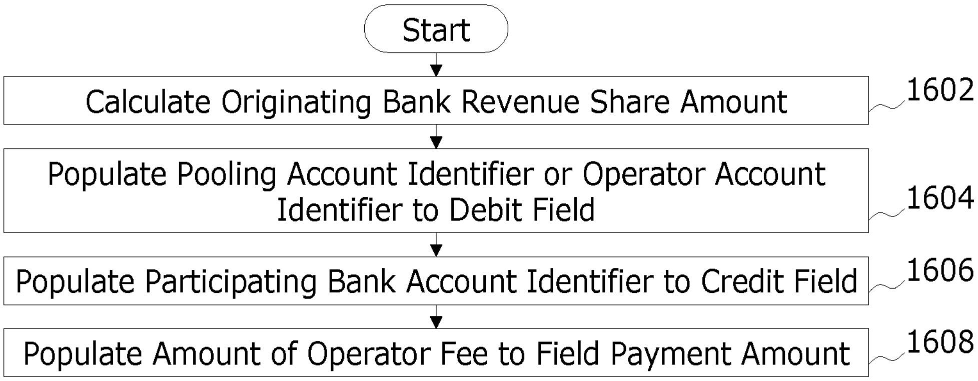
FIG. 43 is a flow chart representing instructions stored in memory and executed by a processor for populating records of revenue share transaction in accordance with an exemplary aspect of the present invention.

Step 213 represents providing the revenue transaction to the originating bank for processing. A revenue share transaction is generated from the pooling account typically in circumstances where the operator fee is less than 100% of the aggregate transaction fees and the revenue share fee is the balance of the aggregate transaction fees. The revenue share transaction may be a record in the EFT file 1302 or a separate transaction. Referring to FIG. 43, generating the revenue share transaction comprises: i) at step 1602, calculating an originating bank revenue share amount, the originating bank revenue share amount being the aggregate transaction fee less the operator fee; ii) at step 1604, populating the pooling account identifier (or the operator account identifier) to a field of the revenue share transaction which identifies an account from which an revenue share amount is to be debited; iii) at step 1606, populating an account identifier of an account owned by the originating bank to a field of the revenue share transaction which identifies an account to which the revenue share amount is to be credited; and iv) at step 1608, populating the amount of the operator fee to a payment amount field of the operator fee transaction, the amount of the operator fee being a portion of the aggregate transaction fee Step 215 represents debiting the revenue share amount from the pooling account (or operator account 37) and step 217 represents crediting the revenue share amount to the originating bank's account.

Steps 219 through 223 represent one embodiment of providing remittance information to each vendor. Step 219 represents a vendor, using a vendor system 49*a*, 49*b*, 49*c* as depicted in FIG. 1*a*, connecting to the system 10 which may be by way of secure connection over the network 20. Step 221 represents looking up the remittance records 273 from the remittance database 330 which represent payments to the connecting vendor and populating those records to a remittance object. Step 223 represents rending the remittance object on the vendor system 49*a*, 49*b*, 49*c*.

In another embodiment, the remittance information may be transferred to the vendor via the vendor's unattended interface module 24. More specifically, the vendor's unattended interface module may utilize check for available BLOB and Download BLOB methods calls to retain the payment instruction file.

It should be appreciated that the above described systems provide for unattended transfer of files over an open network between two unattended applications such a automated payment system and each of a payer's and vendor's ERP systems. In summary, the present invention provides a system for making payments from a payer to a community of vendors, assessing a variable transaction fee to each vendor, on an automated basis. Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. A payment system for making payments from each payer of a community of payers to each vendor of a community of vendors in response to each payer submitting a payment instruction file comprising a group of unique payment records, each payment record comprising: i) the system ID of a disbursing payer, the disbursing payer being a payer within the sub group of payers associated with the originating bank; ii) the system ID of a selected vendor, the selected vendor being a vendor within the community of vendors to which the disbursing payer is issuing a payment; and iii) identification of the amount of the payment, the payment system comprising:

a non-transitory computer readable medium and a processor coupled to the non-transitory computer readable medium;

a vendor database encoded to the non-transitory computer readable medium, the vendor database comprising a unique vendor record for each vendor of the community of vendors, each vendor record comprising: i) identification of a distinct one of the vendors; ii) a unique system ID assigned to the vendor; and iii) a vendor remittance account identifier, the vendor remittance account identifier comprising a routing number and account number of a bank account to which payments to the vendor are transferred;

an events parameters database encoded to the non-transitory computer readable medium, the events parameter database comprising, for each payer, a unique record, the record including: i) a unique login ID identifying an unattended interface module installed on a workstation coupled to a local area network controlled by the payer, ii) identification of a file name used by the payer for each payment instruction file generated by the payer; and iii) a directory path identifying a directory on the local area network controlled by the payer;

a web services server comprising a non-transitory computer readable medium, a processor coupled to the non-transitory computer readable medium, and a transfer server coded to the non-transitory computer readable medium and comprising steps executed by the processor in response to receipt of each web services call from each payer's unattended interface module, the steps comprising:

in response to a first web services call from a payer's unattended interface module, the first web services call including a login ID identifying the unattended interface module:

looking up, in the record of the events parameter database associated with the login ID, the file name and the directory path; and returning, to the payer's unattended interface module, the file name and the directory path;

in response to a second web services call from the payer's unattended interface module, the second web services call comprising the payment instruction file with the file name, as obtained by the unattended interface module from the location on the local area network identified by the directory path:

storing the payment instruction file as a binary object in a non-transitory computer readable database;

returning to the payer's unattended interface module a binary object ID identifying the binary object;

in response to a third web services call from the payees unattended interface module, the third web services call comprising the binary object ID and instructions to make the binary object available to a payment server:

looking up the binary object with the binary object ID; and providing the binary object to the payment server;

the payment server comprising a non-transitory computer readable medium, a processor coupled to the non-transitory computer readable medium, and a payment application coded to the non-transitory computer readable medium and comprising steps executed by the processor, the steps comprising:

obtaining each payment instruction file from the non-transitory computer readable database and, for each payment file:

generating an electronic funds transfer file with a group of fund transfer records by, for each payment record of the payment instruction file:

assigning a unique payment ID to the payment record of the payment instruction file and populating the payment ID to a unique one of the fund transfer records;

populating the amount of the payment from the payment record of the payment instruction file to a field of the unique one of the fund transfer records which identifies a payment amount;

populating a pooling account identifier of the originating bank to a field of the unique one of the fund transfer records which identifies an account from which the payment is debited; and looking up, in the vendor database, the vendor account identifier for the selected vendor and populating such vendor account identifier to a field of the unique one of the fund transfer records which identifies an account to which the payment is credited;

transferring the electronic fund transfer file to an electronic payment network for execution.

2. The system of claim 1:

a web server coupled to the payment server, the web server comprising a non-transitory computer readable medium, a processor coupled to the non-transitory computer readable medium, and a web server application coded to the non-transitory computer readable medium and comprising steps for funding approval executed by the processor, the steps comprising:

in response to each disbursing payer establishing a secure session with the system and selecting a funding approval option, each disbursing payer being one of the payers that provided a payment instruction file:

obtaining a funding total for the disbursing payer from the payment application, the funding total being the aggregate sum of the payment amount of each record of the payment instruction file provided by the disbursing payer;

generating a web page with the funding total;

rendering the web page with the funding total on a remote browser system of the disbursing payer; and obtaining disbursing payer approval of the funding total from the remote browsing system on which the funding approval object is rendered;

providing an indication of approval to the payment application and the instructions of the payment application only transfer the electronic fund transfer file to the electronic payment network for execution after receiving the approval.

3. The system of claim 2, with the web server application further comprising steps for unattended interface configuration, the steps comprising:

in response to each payer establishing a secure session with the system and selecting an unattended interface configuration option:

obtaining, from the payer, the login ID identifying payer's unattended interface module;

obtaining, from the payer, identification of the file name used by the payer for each payment instruction file generated by the payer and identification of the directory path; and writing each of the login ID, the file name, and the directory path to the unique record of event parameters database associated with the payer such that the file name and directory path are made available to the payer's unattended interface module when the payer's unattended interface module makes the first web services call to the web services server.

4. The system of claim 1, further comprising:

a mobile application server coupled to the payment server, the mobile application server comprising a non-transitory computer readable medium, a processor coupled to the non-transitory computer readable medium, and a mobile device server coded to the non-transitory computer readable medium and comprising steps for funding approval executed by the processor, the steps comprising:

in response to each disbursing payer establishing a secure session with the system and selecting a funding approval option, each disbursing payer being one of the payers that provided a payment instruction file:

obtaining a funding total for the disbursing payer from the payment application, the funding total being the aggregate sum of the payment amount of each record of the payment instruction file provided by the disbursing payer;

generating a funding approval object with the funding total;

rendering the funding approval object with the funding total on a remote mobile system of the disbursing payer; and obtaining disbursing payer approval of the funding total from the remote mobile system on which the funding approval object is rendered;

providing an indication of approval to the payment application; and the instructions of the payment application only transfer the electronic fund transfer file to the electronic payment network for execution after receiving the approval.

5. The system of claim 4, with the mobile device server further comprising steps for unattended interface configuration, the steps comprising:

in response to each payer establishing a secure session with the system and selecting an unattended interface configuration option:

obtaining, from the payer, the login ID identifying payer's unattended interface module;

obtaining, from the payer, identification of the file name used by the payer for each payment instruction file generated by the payer and identification of the directory path; and writing each of the login ID, the file name, and the directory path to the unique record of the event parameters database associated with the payer such that the file name and directory path are made available to the payer's unattended interface module when the payer's unattended interface module makes the first web services call to the web services server.

6. The system of claim 1:

each payment record of each payment instruction file further comprises remittance information, the remittance information being text describing the purposes of the payment;

the system further comprises a remittance database encoded to the non-transitory computer readable medium, the remittance database comprising a group of remittance records, each remittance record comprising, for a unique payment: i) the payment ID; ii) the system ID of the disbursing payer; iii) the system ID of the selected vendor; iv) the payment amount; and v) the remittance information;

the instructions of the payment application further include, for each fund transfer record generated, populating to a record of the remittance database: i) the payment ID; ii) the system ID of the disbursing payer; iii) the system ID of the selected vendor; iv) the payment amount; and v) the remittance information; and the steps of the web server further comprise:

in response to a first web services call from a vendor's unattended interface module, the first web services call identifying the vendor and identifying a date range;

looking up, in the remittance database, remittance records for payments made to the vendor within the date range; and generating the remittance file by populating remittance records for payments made to the vendor within the date range;

returning, to the vendor's unattended interface module, a binary object identifier identifying the remittance file; and in response to a second web services call from the vendor's unattended interface module, the second web services call including the binary object identifier;

retrieving the remittance file; and returning to vendor's unattended interface module, in response the create remittance file web services call, the remittance file.

7. The system of claim 6:

a web server coupled to the payment server, the web server comprising a non-transitory computer readable medium, a processor coupled to the non-transitory computer readable medium, and a web server application coded to the non-transitory computer readable medium and comprising steps for funding approval executed by the processor, the steps comprising:

in response to each disbursing payer establishing a secure session with the system and selecting a funding approval option, each disbursing payer being one of the payers that provided a payment instruction file:

obtaining a funding total for the disbursing payer from the payment application, the funding total being the aggregate sum of the payment amount of each record of the payment instruction file provided by the disbursing payer;

generating a web page with the funding total;

rendering the web page with the funding total on a remote browser system of the disbursing payer; and obtaining disbursing payer approval of the funding total from the remote browsing system on which the funding approval object is rendered;

providing an indication of approval to the payment application; and the instructions of the payment application only transfer the electronic fund transfer file to the electronic payment network for execution after receiving the approval.

8. The system of claim 7, with the web server application further comprising steps for unattended interface configuration, the steps comprising:

in response to each payer establishing a secure session with the system and selecting an unattended interface configuration option:

obtaining, from the payer, the login ID identifying payer's unattended interface module;

obtaining, from the payer, identification of the file name used by the payer for each payment instruction file generated by the payer and identification of the directory path; and writing each of the login ID, the file name, and the directory path to the unique record of event parameters database associated with the payer such that the file name and directory path are made available to the payer's unattended interface module when the payer's unattended interface module makes the first web services call to the web services server.

9. The system of claim 6, further comprising:

a mobile application server coupled to the payment server, the mobile application server comprising a non-transitory computer readable medium, a processor coupled to the non-transitory computer readable medium, and a mobile device server coded to the non-transitory computer readable medium and comprising steps for funding approval executed by the processor, the steps comprising:

in response to each disbursing payer establishing a secure session with the system and selecting a funding approval option, each disbursing payer being one of the payers that provided a payment instruction file:

obtaining a funding total for the disbursing payer from the payment application, the funding total being the aggregate sum of the payment amount of each record of the payment instruction file provided by the disbursing payer;

generating a funding approval object with the funding total;

rendering the funding approval object with the funding total on a remote mobile system of the disbursing payer; and obtaining disbursing payer approval of the funding total from the remote mobile system on which the funding approval object is rendered;

providing an indication of approval to the payment application; and the instructions of the payment application only transfer the electronic fund transfer file to the electronic payment network for execution after receiving the approval.

10. The system of claim 9, with the mobile device server further comprising steps for unattended interface configuration, the steps comprising:

in response to each payer establishing a secure session with the system and selecting an unattended interface configuration option:

obtaining, from the payer, the login ID identifying payer's unattended interface module;

obtaining, from the payer, identification of the file name used by the payer for each payment instruction file generated by the payer and identification of the directory path; and writing each of the login ID, the file name, and the directory path to the unique record of the event parameters database associated with the payer such that the file name and directory path are made available to the payer's unattended interface module when the payer's unattended interface module makes the first web services call to the web services server.

* * * * *